US012701160B2

(12) United States Patent
Barker, Jr. et al.

(10) Patent No.: US 12,701,160 B2
(45) Date of Patent: Aug. 4, 2026

(54) SYNCHRONIZING NODES IN A NETWORK

(71) Applicant: TurbineOne, Inc., San Francisco, CA (US)

(72) Inventors: Charles R. Barker, Jr., Orlando, FL (US); Keith Joseph Goldberg, Winter Park, FL (US); Matthew Warren Amacker, Santa Clara, CA (US); Ian Jay Kalin, San Francisco, CA (US)

(73) Assignee: TurbineOne, Inc., San Francisco, CA (US)

( * ) Notice: Subject to any disclaimer, the term of this patent is extended or adjusted under 35 U.S.C. 154(b) by 23 days.

(21) Appl. No.: 18/909,541

(22) Filed: Oct. 8, 2024

(65) Prior Publication Data

US 2025/0141959 A1     May 1, 2025

Related U.S. Application Data

(63) Continuation of application No. 18/608,514, filed on Mar. 18, 2024, now Pat. No. 12,149,587, which is a
(Continued)

(51) Int. Cl.
*H04L 67/1095* (2022.01)
*H04J 3/06* (2006.01)
(Continued)

(52) U.S. Cl.
CPC ........ *H04L 67/1095* (2013.01); *H04J 3/0638* (2013.01); *H04L 12/18* (2013.01);
(Continued)

(58) Field of Classification Search
CPC ... H04L 67/1095; H04L 67/104; H04L 12/18; H04L 12/1863; H04L 41/0654;
(Continued)

(56) References Cited

U.S. PATENT DOCUMENTS

| 6,122,255 A | 9/2000 | Bartholomew et al. |
| 7,031,288 B2 | 4/2006 | Ogier |

(Continued)

FOREIGN PATENT DOCUMENTS

| CN | 107395308 A | * 11/2017 | ........... H04J 3/0661 |
| CN | 109076104 A | 12/2018 | |

(Continued)

OTHER PUBLICATIONS

PCT International Search Report and Written Opinion, PCT Application No. PCT/US2022/018025, Aug. 16, 2022, 19 pages.
(Continued)

*Primary Examiner* — Richard G Keehn
(74) *Attorney, Agent, or Firm* — Fenwick & West LLP

(57) ABSTRACT

A first node may transmit a first multicast beacon to one or more nodes of a squad that form a network. The first node may receive a unicast synchronize request from a second node of the squad. The unicast synchronize request initiates a synchronization process between the first node and the second node and includes a first node list of nodes in the squad. The first node may compare the first node list in the unicast synchronization request to a second node list stored by the first node. The first node may determine one or more node information differences based on the comparison. The first node may transmit a second multicast beacon with the one or more node information differences to the one or more nodes of the squad.

20 Claims, 11 Drawing Sheets

Related U.S. Application Data continuation of application No. 18/094,914, filed on Jan. 9, 2023, now Pat. No. 11,968,257.

(60) Provisional application No. 63/401,004, filed on Aug. 25, 2022, provisional application No. 63/299,828, filed on Jan. 14, 2022.

(51) Int. Cl.

| | |
|---|---|
| *H04L 12/18* | (2006.01) |
| *H04L 41/0654* | (2022.01) |
| *H04L 67/104* | (2022.01) |
| *H04W 4/06* | (2009.01) |
| *H04W 40/24* | (2009.01) |
| *H04W 84/18* | (2009.01) |

(52) U.S. Cl.
CPC ........ *H04L 41/0654* (2013.01); *H04L 67/104* (2013.01); *H04W 4/06* (2013.01); *H04W 40/24* (2013.01); *H04W 84/18* (2013.01)

(58) Field of Classification Search
CPC ......... H04L 69/40; H04J 3/0638; H04W 4/06; H04W 40/24; H04W 84/18
See application file for complete search history.

(56) References Cited

U.S. PATENT DOCUMENTS

| | | | | |
|---|---|---|---|---|
| 7,835,301 | B1 * | 11/2010 | Maufer ................. | H04W 24/02 |
| | | | | 370/254 |
| 7,869,413 | B2 | 1/2011 | Zuniga | |
| 8,645,454 | B2 * | 2/2014 | Mathew ................. | G06F 9/5083 |
| | | | | 709/201 |
| 8,880,941 | B1 | 11/2014 | Reiss et al. | |
| 9,197,546 | B2 | 11/2015 | Kang et al. | |
| 9,875,448 | B2 | 1/2018 | Shahraray et al. | |
| 10,098,081 | B2 | 10/2018 | Kim et al. | |
| 10,298,715 | B2 | 5/2019 | Aikoh et al. | |
| 10,419,293 | B1 * | 9/2019 | She ....................... | H04W 40/24 |
| 10,848,200 | B2 | 11/2020 | Alexander | |
| 11,327,811 | B2 | 5/2022 | Lewis | |
| 11,436,054 | B1 | 9/2022 | Zad et al. | |
| 11,683,774 | B2 | 6/2023 | Oteri et al. | |
| 2004/0199804 | A1 | 10/2004 | Rathunde et al. | |
| 2005/0063419 | A1 | 3/2005 | Schrader et al. | |
| 2005/0094574 | A1 | 5/2005 | Han et al. | |
| 2009/0059799 | A1 | 3/2009 | Friskney et al. | |
| 2009/0161578 | A1 | 6/2009 | Yeung et al. | |
| 2009/0232034 | A1 | 9/2009 | Li et al. | |
| 2009/0252165 | A1 * | 10/2009 | Zhang ..................... | H04W 4/06 |
| | | | | 370/390 |
| 2010/0061292 | A1 | 3/2010 | Weinstein | |
| 2012/0044864 | A1 | 2/2012 | Zhang et al. | |
| 2012/0063397 | A1 * | 3/2012 | Abedi ................... | H04W 72/12 |
| | | | | 370/329 |
| 2012/0166514 | A1 * | 6/2012 | Mathew ................. | G06F 9/505 |
| | | | | 709/201 |
| 2012/0254280 | A1 | 10/2012 | Parker, II | |
| 2012/0310395 | A1 * | 12/2012 | El-Hoiydi ............. | H04W 48/16 |
| | | | | 700/94 |

| | | | | |
|---|---|---|---|---|
| 2013/0016727 | A1 | 1/2013 | Tazzari et al. | |
| 2013/0094536 | A1 * | 4/2013 | Hui ........................ | H04B 1/713 |
| | | | | 375/135 |
| 2013/0107999 | A1 * | 5/2013 | Mainaud ............... | H04J 3/0638 |
| | | | | 375/362 |
| 2014/0047341 | A1 | 2/2014 | Breternitz et al. | |
| 2014/0269637 | A1 | 9/2014 | Banister et al. | |
| 2014/0313966 | A1 * | 10/2014 | Shukla ................... | H04W 48/10 |
| | | | | 370/312 |
| 2015/0234845 | A1 | 8/2015 | Moore et al. | |
| 2015/0256435 | A1 | 9/2015 | Sum et al. | |
| 2016/0182298 | A1 | 6/2016 | Brooks et al. | |
| 2017/0127369 | A1 | 5/2017 | Liu et al. | |
| 2017/0127464 | A1 | 5/2017 | Liu et al. | |
| 2017/0201866 | A1 | 7/2017 | Liu et al. | |
| 2017/0245120 | A1 * | 8/2017 | Huang .................... | H04W 4/06 |
| 2017/0265153 | A1 * | 9/2017 | Grady .................... | H04W 4/06 |
| 2017/0303187 | A1 | 10/2017 | Crouthamel et al. | |
| 2017/0337241 | A1 | 11/2017 | Newbern et al. | |
| 2017/0364602 | A1 * | 12/2017 | Reitz ...................... | G06F 16/40 |
| 2018/0213580 | A1 | 7/2018 | Taskin et al. | |
| 2018/0287904 | A1 | 10/2018 | Brummel et al. | |
| 2018/0332547 | A1 * | 11/2018 | Liu ........................ | H04L 67/104 |
| 2018/0359778 | A1 | 12/2018 | Splitz et al. | |
| 2019/0373438 | A1 * | 12/2019 | Amir ...................... | H04W 4/90 |
| 2020/0117513 | A1 | 4/2020 | Li et al. | |
| 2020/0120607 | A1 * | 4/2020 | Kim .................. | H04W 52/0235 |
| 2020/0169954 | A1 * | 5/2020 | Namba ................... | H04W 4/06 |
| 2020/0210243 | A1 | 7/2020 | Li | |
| 2021/0084566 | A1 | 3/2021 | Kuenzi | |
| 2021/0271516 | A1 | 9/2021 | Hs et al. | |
| 2022/0141635 | A1 | 5/2022 | Menon | |
| 2022/0164240 | A1 | 5/2022 | Kim et al. | |
| 2023/0171578 | A1 * | 6/2023 | Nachmany .............. | H04W 4/80 |
| | | | | 455/41.2 |
| 2023/0231910 | A1 | 7/2023 | Barker et al. | |
| 2023/0359491 | A1 * | 11/2023 | Nordin ............... | H04L 41/0896 |
| 2024/0357498 | A1 * | 10/2024 | Sandhu ............. | H04W 28/0289 |

FOREIGN PATENT DOCUMENTS

| | | | | | |
|---|---|---|---|---|---|
| CN | 107251620 | B | * | 7/2020 | ......... H04W 56/001 |
| DE | 102020201209 | A1 | | 10/2021 | |
| WO | WO-2003/105499 | A1 | | 12/2003 | |

OTHER PUBLICATIONS

PCT Invitation to Pay Additional Fees, PCT Application No. PCT/US2022/018025, Jun. 16, 2022, two pages.

United States Office Action, U.S. Appl. No. 17/681,590, filed Aug. 18, 2022, 12 pages.

United States Office Action, U.S. Appl. No. 17/681,474, filed Feb. 7, 2023, 21 pages.

United States Office Action, U.S. Appl. No. 17/681,598, filed Apr. 24, 2025, 18 pages.

United States Office Action, U.S. Appl. No. 17/681,598, filed Oct. 2, 2025, 21 pages.

United States Office Action, U.S. Appl. No. 17/681,598, filed Sep. 9, 2024, 21 pages.

* cited by examiner

100

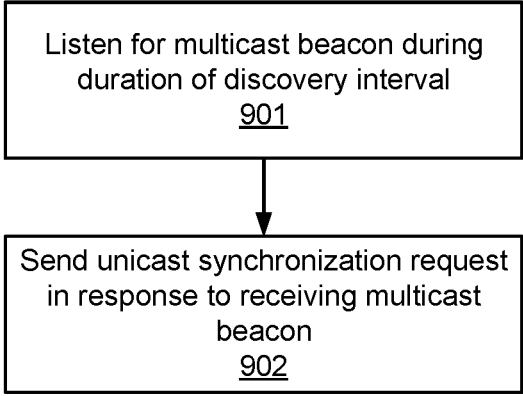

Listen for multicast beacon during duration of discovery interval
901

Send unicast synchronization request in response to receiving multicast beacon
902

FIG. 9A

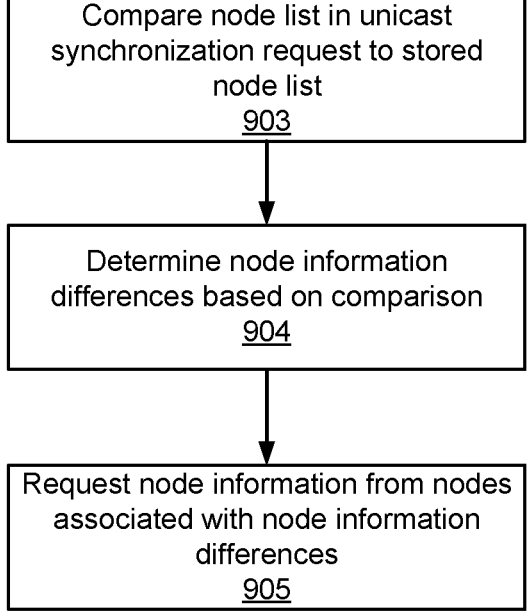

Compare node list in unicast synchronization request to stored node list
903

Determine node information differences based on comparison
904

Request node information from nodes associated with node information differences
905

FIG. 9B

SYNCHRONIZING NODES IN A NETWORK

CROSS REFERENCE TO RELATED APPLICATIONS

This application is a continuation of U.S. patent application Ser. No. 18/608,514 titled "Synchronizing Nodes in a Network" filed on Mar. 18, 2024, which is a continuation of U.S. patent application Ser. No. 18/094,914 titled "Pruning a Distributed Database for An Ad-Hoc Peer-To-Peer (P2P) Network" filed on Jan. 9, 2023, which claims the benefit of U.S. Provisional Application No. 63/299,828, titled "Computational Workload Sharing Combat Suit Using Mesh Networking for Unreliable Nodes," filed Jan. 14, 2022 and U.S. Provisional Application No. 63/401,004, titled "Lightweight node Synchronization Protocol for of Ad-hoc Peer-to-Peer Networking of On-Body Combat Systems," filed Aug. 25, 2022, each of which is incorporated herein by reference in its entirety.

The present disclosure relates to U.S. patent application Ser. No. 18/094,922 titled "Lightweight Node Synchronization Protocol for Ad-Hoc Peer-To-Peer Networking of On-Body Combat Systems" and filed Jan. 9, 2023, which is incorporated herein by reference in its entirety.

BACKGROUND

Body worn computers may be used in the field to increase the perception by a user of the environment surrounding the user of the body worn computer. For example, body worn computers may be connected to cameras, microphones, or other sensors capturing data of the environment surrounding the body worn computer. The body worn computer may then analyze the data streams coming from those sensors and may alert the user if something relevant is detected. However, to increase the portability of body worn computers, and to reduce the impact of the body worn computer on the mobility of the user wearing the body worn computer, body worn computers may have limited computational power compared to larger and heavier stationary computing devices. This limits communication capabilities between devices that may be locally connected, e.g., limiting the size and frequency of data transfers. Moreover, to be portable, body worn computers may run on batteries, further limiting the capabilities of the body worn computer. For example, locally connected devices may have limited range for data communication as well as processing of data between devices. Furthermore, transmitting beacons between the locally connected devices is also computationally expensive and drains power.

SUMMARY

Embodiments relate to synchronizing nodes in a peer-to-peer network, in particular, for executing a light-weight synchronization protocol for on-body combat systems or other nodes. A discovery and synchronization protocol ensures consistency of a database distributed across a peer-to-peer (P2P) network, which may be a mesh network. Each node in the P2P network maintains a list (e.g., a node list) describing each node in a squad and their basic characteristics and service offerings. The database can be queried for service offerings and also queried for specific nodes according to a unique key, thereby providing connectiveness for the squad. In embodiments, the database may also be pruned to avoid resource waste in terms of memory and network attempts relating to nodes that are no longer accessible and that may never rejoin the squad. In various embodiments, the discovery and synchronization protocol can handle new nodes joining a squad, mergers and splits of squads, changes to node information, permanent loss in communication with a node and squad (e.g., node removal from the squad), and may be resilient against multicast packet loss and unicast connectivity failures and slowness. In one embodiment, the synchronization protocol and discovery service may utilize beacon multicasting to a user datagram protocol (UDP) port and a bidirectional unicast protocol (e.g., remote procedure call (RPC) service on a transmission control protocol (TCP) port).

In some aspects, the techniques described herein relate to a method of synchronizing nodes in a peer-to-peer network comprises listening for a first multicast beacon during a duration of a discovery interval. The discovery interval comprises one or more time intervals configured for a plurality of nodes in a squad. In response to receiving the first multicast beacon during the duration of the discovery interval, a unicast synchronization request is sent to a transmitter of the first multicast beacon. The unicast synchronization request comprises a node list. The method further comprises comparing the node list in the unicast synchronization request to a stored node list of the transmitter of the first multicast beacon. The node list in the unicast synchronization request and the stored node list each comprise node information for the squad. Furthermore, the method comprises determining one or more node information differences based on the comparison, and in response to determining the one or more node information differences, requesting node information from one or more nodes associated with the one or more node information differences.

In some aspects, the discovery interval is configured according to a discovery interval data structure, wherein the discovery interval data structure is stored on the plurality of nodes in the squad, and wherein the discovery interval data structure includes: a first pool of time slots reserved for nodes to transmit the unicast synchronization request during a synchronization window; and a second pool of time slots reserved for nodes to transmit the first multicast beacon during a beacon window.

In some aspects, the first pool of time slots and the second pool of time slots include contention free slots and contention slots.

In some aspects, the node information includes: one or more identifiers for each node; and one or more characteristics for each node.

In some aspects, the method further includes: receiving the node information from the one or more nodes associated with the one or more node information differences.

In some aspects, the first multicast beacon includes a first hash of node information of the stored node list of the transmitter of the first multicast beacon.

In some aspects, the method further includes updating the stored node list using the node information from the one or more nodes associated with the one or more node information differences; and generating a second hash of node information of the stored node list of the transmitter of the first multicast beacon after the updating.

In some aspects, the method further includes generating the second multicast beacon including the second hash; and transmitting the second multicast beacon to the plurality of nodes in the squad.

In some aspects, the method further includes: transmitting the first multicast beacon including a first node count; receiving the unicast synchronization request including a second node count; merging the first node count and the second node count to form a third node count; generating the second multicast beacon including the third node count; and transmitting the second multicast beacon.

In some aspects, the method further includes transmitting the first multicast beacon during a beacon window; and receiving the unicast synchronization request during a synchronization window.

In some aspects, the method further includes receiving the unicast synchronization request from a first node in the plurality of nodes in the squad, the first node being different from the one or more nodes associated with the one or more node information differences; receiving a response to the request for the node information from the one or more nodes associated with the one or more node information differences, the response including the one or more node information differences; and transmitting a second multicast beacon including the one or more node information differences.

In some aspects, the node information of the one or more node information differences include a node removal, and wherein the method further includes: determining a failure in the request for the one or more node information differences at a node relating to the node removal; and transmitting a second multicast beacon including the node removal.

In some aspects, the techniques described herein relate to a method of pruning a distributed database for a peer-to-peer (P2P) network, the method including: transmitting a first multicast beacon over the P2P network; receiving a unicast synchronization request in response to the first multicast beacon, the unicast synchronization request including a removed list for the distributed database; comparing the removed list to a locally stored node list to determine a node removal; determining if there is a failure in a node information call made to a node relating to the node removal; subsequent to (e.g., responsive to) a determination of the failure, updating the locally stored node list based on the node removal; and transmitting a second multicast beacon including the node removal, the nodes receiving the second multicast beacon update a locally stored removed list using the node removal.

In some aspects, the unicast synchronization request includes a bidirectional unicast protocol (e.g., remote procedure call). In some aspects, the first and/or the second multicast beacon includes a multicast protocol (e.g., a protocol buffer beacon). In some aspects, the node information call includes a bidirectional unicast protocol (e.g., remote procedure call). In some aspects, the P2P network includes a mesh network. In some aspects, the nodes receiving the second multicast beacon include a squad of mobile nodes.

Other aspects include components, devices, systems, improvements, methods, processes, applications, computer readable mediums, and other technologies related to any of the above.

BRIEF DESCRIPTION OF THE DRAWINGS

FIG. 9A illustrates a method of synchronization of nodes performed using instructions of synchronization request module, according to one or more embodiments.

FIG. 9B illustrates a method of synchronization of nodes performed using instructions of multicast beaconing module, according to one or more embodiments.

Figure 1:
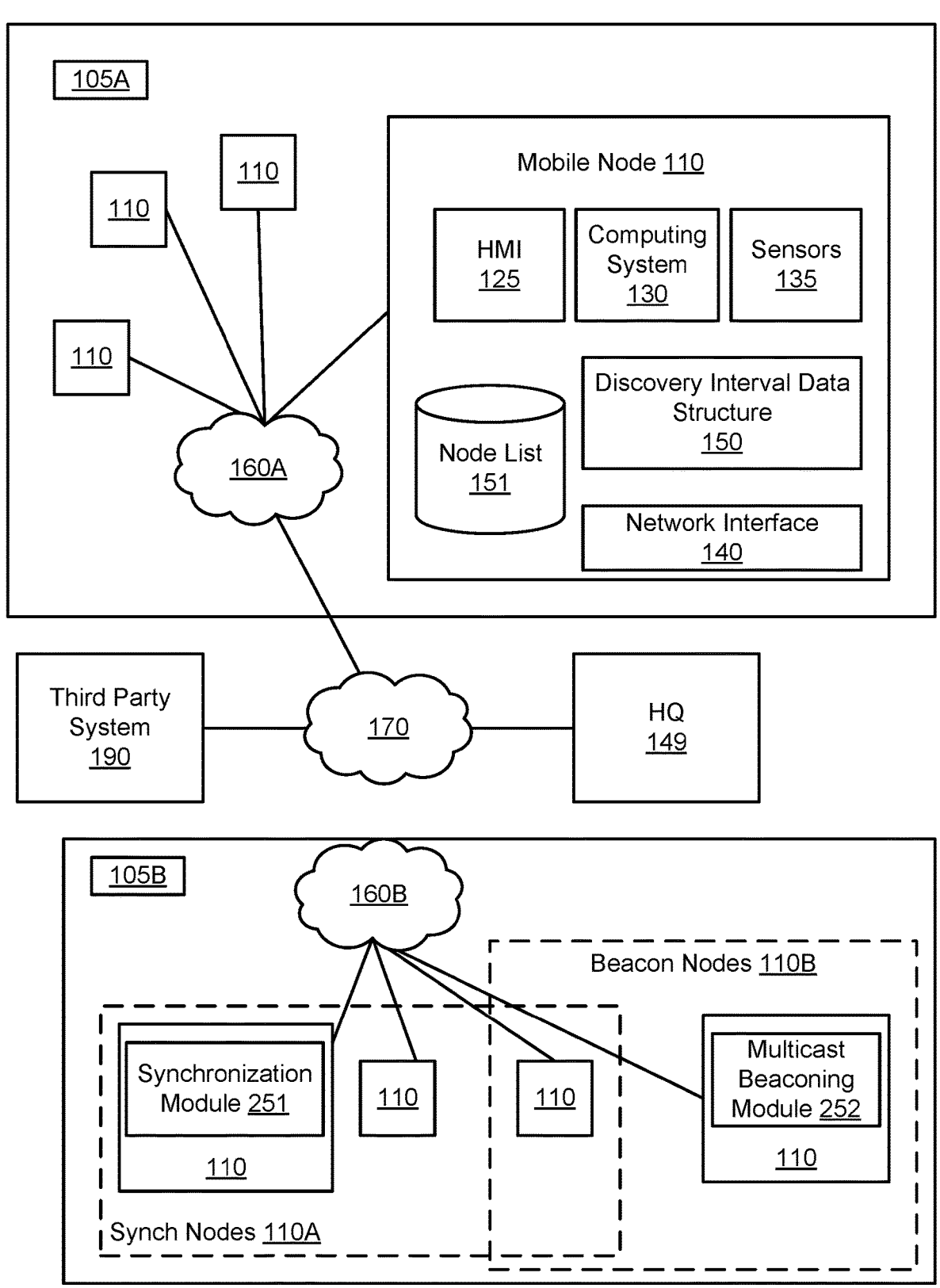
FIG. 1 is a block diagram of a system environment for a squad of mobile nodes, according to one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

As ushed herein, a "mobile node" may refer to a computing device that is configured into an ad-hoc network, such as a mesh network or other peer-to-peer (P2P) network. As used herein, an "ad-hoc network" may refer to a computer network that can be spontaneously formed when computing devices communicate with one another. For example, an "ad-hoc network" can be a local area network that forms temporarily or that changes its topology as computing device move in and out of range of the network. Mobile nodes may include on-body computing devices, remote controllers, autonomous machines (such as robot or drones). On-body computing devices may be wearable computing devices that provide automatic and persistent perception capabilities to the wearer. An on-body computing device may be a specialized computing device. A specialized computing device may have particular functionality. For example, the specialized computing device may be a sensor to sense immediate physical environmental parameters or physiological parameters of a wearer. The specialized computing device also may be function specific, for example, visual processing, audio processing, communications capabilities or other specialized functions. Moreover, the specialized computing devices may have limited processing and power capabilities, for example, to curtain need for larger power supplies and/or keep device as light as possible.

In one embodiment, a grouping of mobile nodes into an ad-hoc network may be referenced as a squad. The mobile nodes (or nodes) forming the squad may be configured to accomplish a specific action (e.g., task) or set of actions (e.g., to form a mission). For example, a squad may include a mesh network of mobile nodes that work cooperatively to accomplish a mission or other tasks. The mobile node may also handle communication, data update, and network resilience amongst specialized computing devices of the squad. In some embodiments, two or more squads may be networked together, e.g., via a communications bridge.

On-body computing devices may be configured to provide the wearer with perception capabilities that would not be feasible for the wearer to perform on their own. For example, the on-body computing device may augment visual perception by providing facial recognition capabilities to match the appearance of persons in the vicinity of the wearer against a database of persons of interest. Moreover, the on-body computing device may provide information about identified persons of interest that may aid the wearer on how to handle an interaction with the person of interest. In another example, the on-body computing device may provide enhanced perception capabilities, such as providing perception capabilities across all directions (e.g., front, back, and sides) of the wearer, in addition to providing perception capabilities across an expanded field by crowdsourcing the analysis of the expanded field across multiple mobile nodes of a squad.

On-body computing devices may be worn by members of a team traversing across a geographical area (e.g., a geographically bounded area). For example, on-body computing devices may be worn by members of a search team searching for a person across a geographical area. The on-body computing devices may provide enhanced perception capabilities and enhanced communication capabilities to the members of the search team to be able to find the target more easily. In another example, on-body computing devices may be worn by soldiers of a squad to provide enhanced perception capabilities and enhanced communication capabilities to obtain information about the state of the battlefield.

In one embodiment, as noted above, a mobile node, such as an on-body computing device may include a set of sensors for enhancing the perception of the wearer. For example, the mobile node includes one or more cameras for capturing images or videos of the surroundings of the mobile node, and an array of microphones for capturing audio of the surroundings of the mobile node. Moreover, the mobile node may include additional sensors such as temperature sensors, proximity sensors, light sensors, gas sensors, etc. The data captured by the sensors may then be analyzed by one or more classification models (e.g., image classification models such as a person of interest detection model or a weapon detection model) run by the mobile node. Furthermore, the output of the classification model may be displayed to the wearer of the mobile node (e.g., though a head mounted display), and/or may be provided to other mobile nodes of the squad.

In one embodiment, the mobile node includes a set of network adapters for establishing a mesh network to communicate with other members of the squad. For example, the mobile node may include a first network adapter that is configured to act as an access point that accepts connections from other members of the squad. The mobile node may include a second network adapter that is configured to search for access points corresponding to other members of the squad and is configured to connect to one or more access points.

In one embodiment, the mobile nodes are configured to communicate among themselves to distribute the workload of executing resource intensive tasks. Specifically, the computational capabilities of wearable devices may be limited to improve the portability or wearability of the device. For example, the size of a battery used to power the wearable device is typically limited so as to not significantly impair the mobility of the wearer, and the computational power of the wearable device is typically limited to improve the battery life of the device. By spreading the workload of resource intensive tasks across multiple mobile nodes, the completion of the resource intensive task may be accelerated.

System Architecture

FIG. 1 is a block diagram of a system environment 100 for a squad 105 of mobile nodes 110, according to one or more example embodiments. The system environment 100 shown by FIG. 1 comprises one or more squads 105 (e.g., first squad 105A and second squad 105B), a headquarter (HQ) node 149, and a cloud network 170. In some embodiments, the system environment 100 additionally includes one or more third-party systems 190. In alternative configurations, different and/or additional components may be included in the system environment 100.

The squad 105 comprises one or more mobile nodes 110 (also referred to herein as "nodes 110") that are communicatively coupled with each other through a peer-to-peer (P2P or p2p) network 160, which in some embodiments may be include one or more mesh networks. For instance, the diagram illustrated in FIG. 1 includes two squads 105A and 105B. The first squad 105A may include a first set of mobile nodes 110 connected to each other through a first mesh network 160A. The second quad 105B may include a second set of mobile nodes 110 connected to each other through a second mesh network 160B.

The mobile nodes 110 are computing devices capable of receiving user input as well as transmitting and/or receiving data via the p2p network 160 or the cloud network 170. In one embodiment, a mobile node 110 is an on-body node or a wearable node. An on-body node or a wearable node is a computer system implemented in an enclosure that can be worn by a person. Alternatively, the mobile node 110 may be a device having computer functionality, such as a personal digital assistant (PDA), a mobile telephone, a smartphone, or another suitable device that is portable and can be carried by a person. In yet other embodiments, the mobile node 110 is a computing device embedded or attached to remote controlled or autonomous machines (such as drones).

The mobile node 110 is configured to communicate with other mobile nodes within the squad 105 via the p2p network 160. The p2p network may be created by establishing node to node connections between two or more nodes of the squad. In some embodiments, a mobile node 110 is able to communicate with other nodes that are connected to the p2p network 160 but not directly connected to the mobile node via an intermediary node or a chain of intermediary nodes. Moreover, a mobile node 110 may be configured to communicate (e.g., to devices outside of the squad 105) via the cloud network 170. In some embodiments, the mobile nodes 110 of a squad is able to connect to the cloud network 170 as long as at least one node has a connection to both the cloud network 170 and the p2p network 160 of the squad. In some embodiments, a squad may not have a connection to the cloud network 170. For instance, the second squad 105B of FIG. 1 has a set of mobile nodes 110 that are connected to each other but that do not have a connection to the cloud network 170. In this example, none of the nodes of the squad 105B may be within range of an access point for connecting to the cloud network 170.

In one embodiment, the mobile node 110 executes an application for presenting information to a user of the mobile node 110. Additionally, a mobile node 110 may execute an application allowing a user of the mobile node 110 to interact with the other mobile nodes 110, the HQ node 149, or the one or more third-party systems 190. For example, a mobile node 110 executes classification models to present information corresponding to the environment surrounding the user of the mobile node 110. In another example, the mobile node 110 receives executes a communication application for receiving or transmitting information from other mobile nodes 110 corresponding to the environment surrounding to users of the other mobile nodes 110, or executes a work-sharing application for sharing computational power with other mobile nodes 110 for analyzing the environment surrounding the mobile node 110 or the environment surrounding the other mobile nodes 110.

Each mobile node 110 includes a human-machine interface (HMI) 125, one or more computing system 130, a set of sensors 135, a discovery interval data structure 150, a node list 151, and one or more network interfaces 140. In embodiments, the node list 151 may be implemented as a distributed database that is maintained and distributed across the mobile nodes 110 of a squad 105.

The HMI 125 includes input and output devices. The HMI 125 is configured to receive information from the mobile system 110 of the mobile node 110 or the computing system 130, and control and output device for presenting the received information or otherwise providing a stimulus based on the received information to the user of the mobile node 110. For example, the HMI includes a display for presenting a graphical user interface (GUI) to the user of the mobile node 110. The display may be a head-mounted display (HMD) such as a helmet with an eye shield. Alternatively, the display may be a display device embedded in the computing system 130 (e.g., a display of a smartphone). In some embodiments, the HMI includes multiple displays for presenting different pieces of information to the user of the mobile node 110. The GUI may be configured to present visual notifications to the user of the mobile node 110. In some embodiments, the GUI for displaying information to the user of the mobile node 110 is generated or rendered by the computing system 130, or a separate processor embedded in the HMI 125. In some embodiments, the HMI includes other output devices such as speakers or headphones for providing audible cues or notification (e.g., beeps, buzzes, etc.), haptic devices for providing haptic cues (e.g., vibrations), light sources (such as strobe lights), heat sources, etc.

Moreover, the HMI 125 is configured to receive inputs from a user of the mobile node 110 and provide signals to the mobile system 110 of the mobile node 110 or the computing system 130 of the mobile node 110 for processing. For example, the HMI includes a microphone (e.g., for receiving voice inputs), a camera (e.g., for receiving gesture inputs), one or more buttons (e.g., as part of a keyboard and/or keypad), a touch screen, a pointing device, accelerometers, etc. In some embodiments one or more input devices of the HMI are embedded devices of the computing system (e.g., a microphone and touch screen of a mobile smartphone).

The computing system 130 is configured to perform computational tasks, e.g., communications, data processing, or tracking. In some embodiments, the computing system 130 receives a set of inputs (such as video input recorded by a camera or audio input recorded by a microphone) and processes the inputs based on predefined tasks. Moreover, the computing system 130 may perform additional tasks as requested by the operator of the mobile node 110, or as requested by other mobile nodes 110 or the HQ node 149 communicating through the network. In some embodiments, the computing system 130 includes a mobile smartphone or other mobile computing devices. An example of a computing system 130 that can be used in a mobile node 110 is provided below in conjunction with FIG. 11.

The sensors 135 are configured to capture data of the surroundings of the mobile node 110. For example, the mobile node 110 may include one or more (e.g., an array) cameras for capturing images or videos of the surroundings of the mobile node 110. The images or videos captured by the one or more cameras may be sent to classification models being run by the computing system 130 to identify conditions of the surroundings of the mobile node, including the recognition of object and individuals in the vicinity of the mobile node. Moreover, the mobile node 110 may include one or more (e.g., an array) microphones for capturing audio of the surroundings of the mobile node. The audio being captured by the array of microphones may be sent (e.g., transmitted) to classification models to identify conditions of the surroundings of the mobile node, including the triangulation of specific audio cues (e.g., explosions or gunshots) to identify the direction or location the audio cues originated from. In some embodiments, the sensors 135 include additional sensors, e.g., temperature sensors, pressure sensors, proximity sensors, light sensors, and/or gas sensors.

In some embodiments, one or more (e.g., an array) sensors 135 are connected to the computing system 130 and provide the data captured by the sensors to the computing system 130. Alternatively, one or more sensors 135 may be connected to other components of the mobile node 110 through the network interface 140. For example, the sensors may have a wireless network adapter and my register with the network interface 140 during a boot (e.g., system startup) process. Each sensor may have a specific address or port number and other components of the mobile node 110 (and optionally other mobile nodes of the squad) are able to request data from each of the sensors by transmitting requests to the address or port number assigned to the corresponding sensor.

The discovery interval data structure 150 stores data relating to a discovery interval configured for a squad. As used herein, a "discovery interval" may refer to one or more predefined time that establish when actions are expected of each node 110 participating in the synchronization protocol. For example, the discovery interval may be a set time limit for when nodes 110 in a squad 105 will wait to perform a follow-up action after an action that was previously performed, such as the transmitting or receiving of a message. In embodiments, the discovery interval is configured according to the discovery interval data structure 150. Each mobile node 110 in a squad 105 stores the discovery interval data structure 150. The discovery interval structure 150 includes time slots that may each be assigned to a particular mobile node 110 in the squad 105. Each time slot may operate according to a set timer that will initiate the next action upon expiration. In embodiments, the time slots may be divided into two separate pools. The first pool of time slots may be reserved for nodes 110A (also referred to herein as "synch nodes" 110A) that are expected, assigned, or desiring to transmit a unicast synchronization request. As used herein, a "synch node" may refer to a node that is configured to, during some period of time (e.g., during an allotted time slot in a synchronization window), transmit a unicast synchronization request. The second pool of time slots may be reserved for nodes 110B (also referred to herein as "beacon nodes" 110B) that are expected, assigned, or desiring to transmit a multicast beacon. As used herein, a "beacon node" may refer to a node that is configured to, during some period of time (e.g., during an allotted time slot in a beacon window), transmit a multicast beacon. In one embodiment, each time slot in the discovery interval structure 150 may be of a predefined constant time. For example, the duration of time allotted for each time slot may be a fixed constant calculated based on expected or average propagation delays experienced by the p2p network 160. The propagation delay for the p2p network 160 may depend on the radio technology, mesh protocol optimizations, the size, shape, and density of the network mesh, other mesh or network characteristics, or some combination thereof. In one embodiment, each time slot may be configured according to a worst-case, end-to-end propagation delay across the p2p network 160.

The node list 151 delineates and describes each mobile node 110 in the squad and its characteristics and other information. The node list 151 comprises the list of nodes 110 in the squad 105 and node information for each of the nodes 110. Each node 110 maintains its own copy of the node list 151. At any given time, a node's stored node list may vary from another node's stored node list in the squad 105, as a result of adding or missing information. As used herein, a "stored node list" refers to a node list 151 that is locally stored on a node 110 and that can be compared to a node list 151 received in a message. Each node 110 in the node list may be identified by an address (e.g., network address or node location) and/or name (e.g., hostname or other recognizable name). In embodiments, node information for each node may include a service address (e.g., RPC Service IP Address or other service IP address, such as v6 or v4), node name (e.g., hostname, name intended for human readability in a user interface and/or network logs), characteristics of the node 110, other information relating to a node 110, or some combination thereof. In embodiments, characteristics of a node 110 may include services offered by the node 110, status of the node 110, computational state of the node 110, power state of the node 110, other informative description about the node 110 and its capabilities, or some combination thereof. Some non-limiting services offered by a node 110 may include machine learning capabilities, camera or other sensor capabilities, alert capabilities, other services or capabilities, or some combination thereof. As such, in embodiments, the node information for a node 110 may include identifiers that uniquely identify or classify a particular machine learning (ML) agent running on the node 110, a particular camera/sensor or particular camera/sensor system operating on the node 110 (e.g., sensor 135), a particular type of alert delivered by the node 110, a particular consumer, user, or wearer of the node 110, other identifier or classification of a node service, or some combination thereof.

In embodiments, each node maintains the node list 151 (e.g., stored node list) identifying the currently known mobile nodes 110 that are known to itself, including itself (e.g., the list of names or other unique identifier for each mobile node 110 in the squad and its own name or unique identifier). In embodiments, the node list 151 may be maintained and sorted according to a set order, such as being sorted according to an internet protocol (IP) address or other unique identifier or network address. As such, when the node list 151 stored on one mobile node 110 matches the information in the node list 151 stored on another mobile node 110 (e.g., contains the same node information without any new or missing information), the hash of each node list 151 will also match. Furthermore, having an ordered node list 151 also gives each mobile node 110 a way to compute a timer offset. In one embodiment, the timer offset of a mobile node 110 is computed as the position of the mobile node 110 in the node list 151 multiplied by the base propagation delay for the p2p network 160. As such, the timer offset reduces the likelihood of overlapping transmissions between each mobile node 110 in the squad 105.

The network interface 140 is configured to receive and transmit information from network interfaces of other mobile nodes 110 and the HQ node 149. In some embodiments, the network interface 140 is configured to receive information (such as data packets) from other components of the mobile node 110 (such as the computing system 130) and emit electromagnetic signals generated based on the received information. Moreover, the network interface 140 is configured to capture electromagnetic signals emitted by a network interface of another mobile node 110 and generate signals to provide to other components of the mobile node 110 (such as the computing system 130) for processing. In some embodiments, the network interface 140 includes one or more (e.g., an array) antennas to transmit and receive electromagnetic signals (wireless signals). Moreover, each mobile node 110 may include multiple network interfaces 140. For example, each node may have a primary network interface for connecting to a primary network, and a secondary network interface for connecting to a secondary network to be used if the primary network becomes unavailable.

The HQ node 149 may be a node from where the operation of the squad 105 is controlled. For example, the HQ node 149 may provide instructions to each member of the squad 105 or to the squad as a whole to execute a mission in the field. In some embodiments, the HQ node 149 is a stationary or semi-stationary node. For example, the HQ node may be installed in a building that operates as a command center for the operations of the squad. Alternatively, the HQ node may operate from a vehicle, such as a High Mobility Multipurpose Wheeled Vehicle (HMMWV or Humvee). In some embodiments, the HQ node 149 has a higher computational capability than each of the mobile nodes 110.

The mobile nodes 110 and the HQ node 149 are configured to communicate via the cloud network 170, which may comprise any combination of local area and/or wide area networks, using both wired and/or wireless communication systems. For example, the network 170 may communicatively couple two or more squads 105, and their respective nodes 110, within a local area network and further communicatively couple with HQ 149 and/or third-party system 190, within a wide area network. In one embodiment, the cloud network 170 uses various communications technologies and/or protocols. For example, the cloud network 170 includes communication links using technologies such as Ethernet, 802.11, worldwide interoperability for microwave access (WiMAX), generational cellular data networks (e.g., 3G, 4G, 5G, 6G, or other x-generation mobile network technology (x being an integer)), code division multiple access (CDMA), digital subscriber line (DSL), etc. Examples of networking protocols used for communicating via the cloud network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the cloud network 170 may be represented using any suitable format, such as hypertext markup language (HTML) or extensible markup language (XML). In some embodiments, all or some of the communication links of the cloud network 170 may be encrypted using any suitable technique or techniques. Further, the cloud network 170 may be a private network and may be configured to include additional security protocols, including authentication mechanisms and/or encryption mechanisms.

One or more third party systems 190 may be coupled to the cloud network 170 for communicating with the mobile nodes 110 or the HQ node 149. In one embodiment, a third-party system 190 is an application provider communicating information describing applications for execution by the mobile nodes 110 or the HQ node 149, or communicating data to the mobile nodes 110 or the HQ node 149 for use by an application executing on the mobile nodes 110 or the HQ node 149. In other embodiments, a third-party system 190 provides content or other information for presentation via a mobile node 110.

Furthermore, each mobile node 110 may comprise a synchronization module 251 and a multicast beaconing module 252, which may store computer-readable instructions for performing actions when participating in the synchronization protocol. One or more processors of a mobile node 110 may execute instructions of the synchronization module 251 or multicast beaconing module 251 depending on if the mobile node 110 is acting as synch node 110A or beacon node 110B at a particular moment in time assigned in the discovery interval data structure 150.

Figure 2:
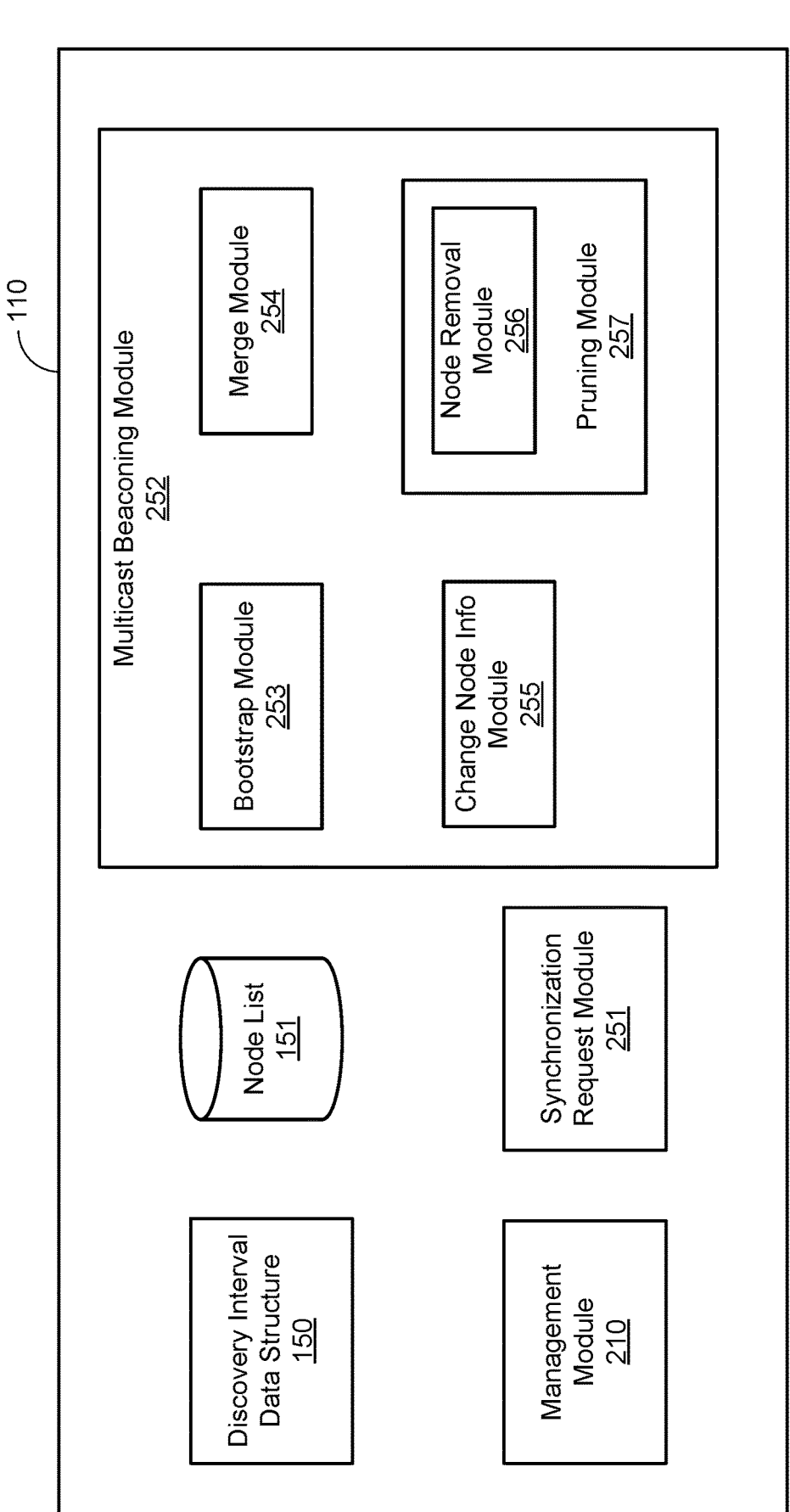
FIG. 2 is a block diagram of a mobile node, according to one or more embodiments.

Turning now to FIG. 2, illustrated is a block diagram of a mobile node 110, according to one or more example embodiments. As illustrated, the mobile node includes a synchronization request module 251, a multicast beaconing module 252, the discovery interval data structure 150, the node list 151, a bootstrap module 253, a merge module 254, a change node info module 255, a pruning module 257, a node removal module 256, and a management module 210. In other embodiments, the mobile node 110 may include additional, fewer, or different components for various applications. It is noted that the reference to modules is for ease of discussion. Modules may be hardware-based modules (e.g., a processor (e.g., one or more processors, controllers, and/or state machines configured specifically to executed functions as described herein) based system configured to execute the functionality described), software-based modules (e.g., software components structured as computer program code comprised of instructions storable on a non-transitory computer readable storage medium) and executable by a processor, or a combination thereof (e.g., firmware configured as coded program code within a hardware component having a processor).

The management module 210 is configured to receive event messages, process the event messages, and determine the number and method of communication channels to be used for rendering the events to the HMI. In some embodiments, the management module 210, includes hard-coded or program-determined notification paths. Moreover, the management module 210 may allow for custom notification paths (e.g., through an if-this-then-that user interface and programming paradigm). The management module 210, may track events that have been acknowledged and the events that have been already seen, and outputs the events to the appropriate channels of the HMI. In some embodiments, the management module 210 has the options of forwarding un-acknowledged events to other members of the squad in an escalation scheme.

In some embodiments, the management module 210 maintains a notification database. The notification database may store a set of notifications that have been provided to the user of the mobile node 110. Moreover, the notification database may include an indication whether each of the notifications have been acknowledged by the user of the mobile node 110. In some embodiments, the notifications are stored as a time-series (e.g., organized by timestamp). Moreover, for each notification, the notification database may store information about the source of the notification. For example, if a notification is provided to a user of a mobile node 110 in response to an event detected by another node, the notification database stores information about the node that triggered the notification, the equipment that captured the data that triggered the notification, the location of the node that triggered the notification when the notification was triggered, etc.

The management module 210 allows for the shared utilization of a central processing unit (CPU), graphical processing unit (GPU), memory, battery, and other limited computational systems across the mobile nodes 110 connected through the p2p network 160 (or optionally through the cloud network 170). For example, the management module 210 enables computer processing tasks to be spread across the multiple mobile nodes 110. The management module 210 may receive as inputs task request for processing image streams, audio streams, and other signal data (e.g., radio, infra-red, data-feeds, etc.).

By way of example, machine learning and computer perception models or algorithms can be applied to image streams or audio streams. These models or algorithms may be resource intensive and time consuming. To alleviate the constraint of these resource-intensive and time-consuming tasks on mobile nodes with limited capabilities, tasks are shared across multiple mobile nodes 110. The management module 210 coordinates the execution of these tasks across multiple mobile nodes connected to each other via the p2p network 160. The management module 210 may also handle tracking utilization of on-board resources and querying and recording the resource utilization across the mobile nodes 110 of the squad 105. In some embodiments, the output of the management module 210 is a stream of events representing the detection and perception results from the machine learning and computer perception models or algorithms on the input data streams, and events that represent requests for data off-load to other mobile nodes within the squad.

The management module 210 is configured to manage events and event messages between the mobile nodes 110 of a squad 105. For example, the management module 210 is configured to receive event messages from other mobile nodes 110 of the squad 105 and perform one or more actions based on the contents of the received event message. Moreover, the management module 210 may be configured to forward event messages to other mobile nodes 110 connected to the p2p network 160.

In some embodiments, events associated with event messages correspond to interactions by a user of a mobile node 110 through the HMI 125 of the mobile node 110, outputs of the management module 210, changes detected by the management module 210, outputs from the computing system 130, and the like.

In some embodiments, the management module 210 is configured to track a history of an event. For example, the management module 210 may keep track of whether actions for addressing the event have been performed by mobile nodes of a squad. Moreover, the management module 210 is configured to de-duplicate and/or merge event messages corresponding to the same event.

The management module 210 is configured to manage the connection between a mobile node 110 and other mobile nodes that are connected to the p2p network 160. Moreover, the management module 210 may be configured to manage the connection between mobile nodes 110 and other nodes (such as the HQ node 149 or a third-party system 190) connected to the cloud network 170.

In some embodiments, the management module 210 is configured to monitor the connections between a mobile node 110 and other entities (such as other mobile nodes, the HQ node, or third-party systems) connected to the network. The management module 210 may keep track of the signal strength and network paths between the mobile node 110 and other entities connected to the mobile node through the p2p network 160.

Synchronization request module 251 initiates a synchronization process between two or more nodes 110 in a squad 105. Namely, the synchronization request module 251 transmits a unicast synchronization request to the transmitter of a multicast beacon. The unicast synchronization request is a data message that comprises the node list 151, in particular, the stored node list of the transmitter, and that may trigger an event that will cause the multicast beacon transmitter to transition into a new state. In one embodiment, the unicast synchronization request may be a bidirectional unicast protocol (e.g., remote procedure call, such as provided through an RPC service). That is, the unicast synchronization request message from a transmitter may call a synchronization service at the receiver. In one embodiment, the unicast synchronization request may further comprise a removed list. The removed list may contain a list of nodes 110 to remove from the squad 105.

Computer-readable instructions of the synchronization request module 251 are executed during a discovery interval by a node 110A (or processor thereof) during an allotted time slot in a synchronization window that the synch node 110A is assigned to (as described in greater detail with respect to FIG. 3 further below). As used herein, a "synchronization window" may refer to a time window in which a unicast synchronization request may be expected by the mobile nodes 110 in a squad 105 to be transmitted during the discovery interval.

In embodiments, the synchronization request module 251 is configured to listen for a multicast beacon during a duration of the discovery interval, and in response to receiving the multicast beacon during the duration of the discovery interval, transmit a unicast synchronization request to the transmitter of the multicast beacon. For example, the multicast beacon may be a first multicast beacon that is listened for during a beacon window, prior to receiving a second (follow-up) multicast beacon containing node information differences. As used herein, a "beacon window" may refer to a time window in which a multicast beacon may be expected by the mobile nodes 110 in a squad 105 to be transmitted during the discovery interval.

Transmission of multicast beacons can be computationally expensive, or drain other resources such as power, memory, and network bandwidth; therefore, a unicast synchronization request may instead be used to synchronize data between two nodes in squad 105, such as resolving any node information differences between a received node list and a stored node list. As used herein, "node information differences" may refer to differences in data associated with a node in the node list 151, such as new or missing information about the mobile nodes 110 in a squad 105 and/or their characteristics (e.g., the current state of a mobile node 110, the services it is running, the sensors that are operational on the mobile node 110, etc.).

Upon synchronizing and resolving node information differences between the two nodes, the changes to the node list can then be propagated to other nodes in the squad 105. The sequence of actions for resolving the node information differences may be carried out according to time slots configured in a discovery interval data structure 150 stored at each node 110.

Multicast beaconing module 252 transmits multicast beacons, such as for multicasting data to the squad 105. The multicasting signal may be a broadcast signal. In embodiments, the multicast beacon may comprise the beacon transmitter's (e.g., beacon node 110B) node information, a network identifier, a node count (e.g., number of nodes in the squad 105 or counted in the node list 151), a hash of the node information in the node list 151 (e.g., hash of all node information as known to be current and update by the beacon node 110B), a set of updates and/or removals from the node list 151 (e.g., node list differences), other information for the squad 105, or some combination thereof. In one embodiment, the multicast beacon is sized to fit inside a single user datagram protocol (UDP) maximum transmission unit (MTU) to avoid fragmentation. In embodiments, the multicast beacon may be a serialized data message, such as Protocol Buffers (Protobuf) beacon.

Computer-readable instructions of the multicast beaconing module 252 are executed during a discovery interval by a node 110A (or processor thereof) during an allotted time slot in the beacon window that the beacon node 110B is assigned to (as described in greater detail with respect to FIG. 3 further below). In embodiments, multicast beaconing module 251 may transmit out the multicast beacon when the allotted time slot has lapsed or its associated timer has expired. Multicast beaconing module 252 also transmits the multicast beacon on-demand upon receiving a unicast synchronization request, or if the beacon node 110B fails to reach a mobile node 110 in the squad 105.

In embodiments, multicast beaconing module 252 compares the node list 151 in the unicast synchronization request to its stored node list (as a beacon node 110B) and determines node information differences based on the comparison. In response to determining node information differences, multicast beaconing module 252 requests node information from the nodes associated with the node information differences. For example, the beacon node 110B may generate and transmit a message call to directly exchange node information with a single mobile node 110 in the squad 105. The beacon node 110B may generate and transmit multiple message calls to exchange node information individually and directly with each node that is associated with a determined node information difference. The request for node information, also referred to herein as a "node information call," may be a bidirectional unicast protocol (e.g., remote procedure call, such as provided through an RPC service). The node information call may act as a direct query, where a node 110 that receives the node information call may respond with its identifier (e.g., name, network address, order in the node list, and/or priority in the discovery interval) and characteristics (e.g., list of running services or other node information). As an example, the beacon node 110B may transmit a node information call to a node 110 that is listed as losing or gaining service in the node list 151 of the synch node 110A which has not been accounted for in the stored node list of the beacon node 110B. As such, the beacon node 110B can directly verify with the node 110 in question which node list 151 is correct and up to date. As another example, the beacon node 110B may transmit a node information call to a node 110 that is included in its stored node list 151 but that has been removed from the node list 151 (e.g., added to a remove list) of the synch node 110A. In both examples, the beacon node 110B may listen for a response to the node information call to receive the node information from the associated nodes.

In one embodiment, if the node information call fails (e.g., because the node in question is not reachable), then the beacon node 110B may adopt the node information from the larger list between its stored node list 151 and the node list 151 of the synch node 110A. That is, if its own node database/node list 151 is larger than the node list 151 provided in the unicast synchronization request, then the beacon node 110B accepts its own information as being more likely to be true, and vice-versa.

In one embodiment, if a removed list of the synch node 110A contains nodes 110 that the beacon node 110B had in its current node list 151, then the beacon node 110B may set the nodes in the removed list aside (also referred to herein as "pending removal nodes") and transmit a node information call to resolve the conflict. If the node information call succeeds, then the pending removal nodes may be included as an update in a "node information difference" list. The node information difference list may be a list, relational table, or other data structure that delineates node information differences that are to be propagated by the beacon node 110B to the nodes 110 of the squad 105 in a follow-up multicast beacon. If the node information call fails, then the pending removal nodes may be included as/associated with a removal action in the node information difference list.

In embodiments, the beacon node 110B updates its stored node list using the node information received in the node information calls made to all of the nodes associated with the node information differences between its stored node list 151 and the synch node 110A's node list 151. After updating its stored node list 151, the beacon node may generate a second (new) hash of the node information in its stored node list 151. In one embodiment, when a multicast beacon is received by another node 110 in the squad 105, the receiver first updates or removes any nodes 110 included in the node difference list. The removed nodes may then be added to the removed list, regardless of whether they were previously known. In one embodiment, if needed, the receiver also incorporates the transmitter's (e.g., the beacon node 110B) node information from the multicast beacon, even if no node information differences are specified. Then, the receiver compares the node count and hash in the multicast beacon to its own (revised/updated) node list 151. If the receiver detects a difference between its node list 151 and the transmitter's node list 151, either by node count or hash, it selects a discovery interval from the synchronization window as backoff time (e.g., shorter than the shortest beacon window time slot, but longer than the slot time delay, in case of fragmentation). During this backoff time, reception of a new multicast beacon continues the process of incorporating node information differences. If, after the backoff time, a node 110 in the squad 105 still has not received an updated multicast beacon with the same node count and hash as its own, the node 110 may transmit a unicast synchronization request to the most recent multicast beacon transmitter using its current stored node list 151 and the removed list.

In embodiments, the multicast beaconing module 252 is further configured to generate a second ("follow-up") multicast beacon comprising a second (updated) hash of its stored node list 151 and transmit/multicast the second multicast beacon to the nodes 110 in the squad 105. Once any differences are resolved in this manner, the beacon node 110B may immediately transmit the second multicast beacon with the node information difference list accumulated through making the node information calls to the corresponding nodes associated with each information difference. In one embodiment, when there is large set of node information differences to be resolved, the beacon node 110B may preemptively transmit the second multicast beacon while the node information differences are still resolving. At that point in time, the second multicast beacon may be sent with only the node information differences that have already been resolved, and the other nodes 110 in the squad may reset their synchronization window backoff timers, thereby giving the node information calls time to complete and resolve the entire set of node information differences in a subsequent cycle through the discovery interval.

In one embodiment, if a beacon node 110B has a stored node list 151 that contains no other nodes 110 other than itself, then it may have no squad 105 member (e.g., mesh neighbors) who may benefit from node information differences sent in a second multicast beacon. In this embodiment, when the beacon node 110B receives a unicast synchronization request from a synch node 110A, the node may immediately integrate the synch node 110A's entire node list and transmit the second multicast beacon without any node information differences.

In one embodiment, as a further optimization, when a beacon node 110B's node list is small and the synch node 110A's node list is large, the beacon node 110B may transmit a node information call to every previously known node 110 in the squad 105 directly, and the nodes 110 may skip multicast beacon transmission unless there are further discrepancies.

Multicast beaconing module 252 may comprise a bootstrap module 253 configured to transmit a first multicast beacon comprising a first node count and receive the unicast synchronization request comprising a second node count. The bootstrap module 253 is further configured to generate a second multicast beacon comprising the second node count and transmit the second multicast beacon. Further details regarding bootstrapping a node 110 into a squad 105 are provided with respect to the description of FIG. 5 further below.

Multicast beaconing module 252 may comprise a merge module 254. The merge module is configured to transmit a first multicast beacon during a beacon window, receive a unicast synchronization request during a synchronization window, and transmit a second multicast beacon comprising node information differences in a node list 151, including nodes 110 newly added or merged into a squad 105. Further details regarding merging nodes 110 of a first squad 105A and second squad 105B are provided with respect to the description of FIG. 6 further below.

Multicast beaconing module 253 may comprise a change node info module 255. The change node info module 255 is configured to receive a unicast synchronization request from a first node in a squad 105. The first node is different from nodes associated with node information differences found in the node list 151 of the beacon node 110B. The change node info module 255 receives a response to a request for node information. The received response comprises the node information differences. The change node info module 255 further transmits a second multicast beacon comprising the node information differences. Further details regarding changing an existing node's node information are provided with respect to the description of FIG. 7 further below.

Multicast beaconing module 252 may further comprise a pruning module 257 configured to prune the node list 151. The pruning module 257 may further comprise a node removal module 256. The node remove module 256 is configured to determine a failure in a request for node information differences from the removed node and transmit a second multicast beacon comprising the node removal. Further details regarding removing a node 110 from a current node list 151 are provided with respect to the description of FIG. 8 further below.

Figure 3:
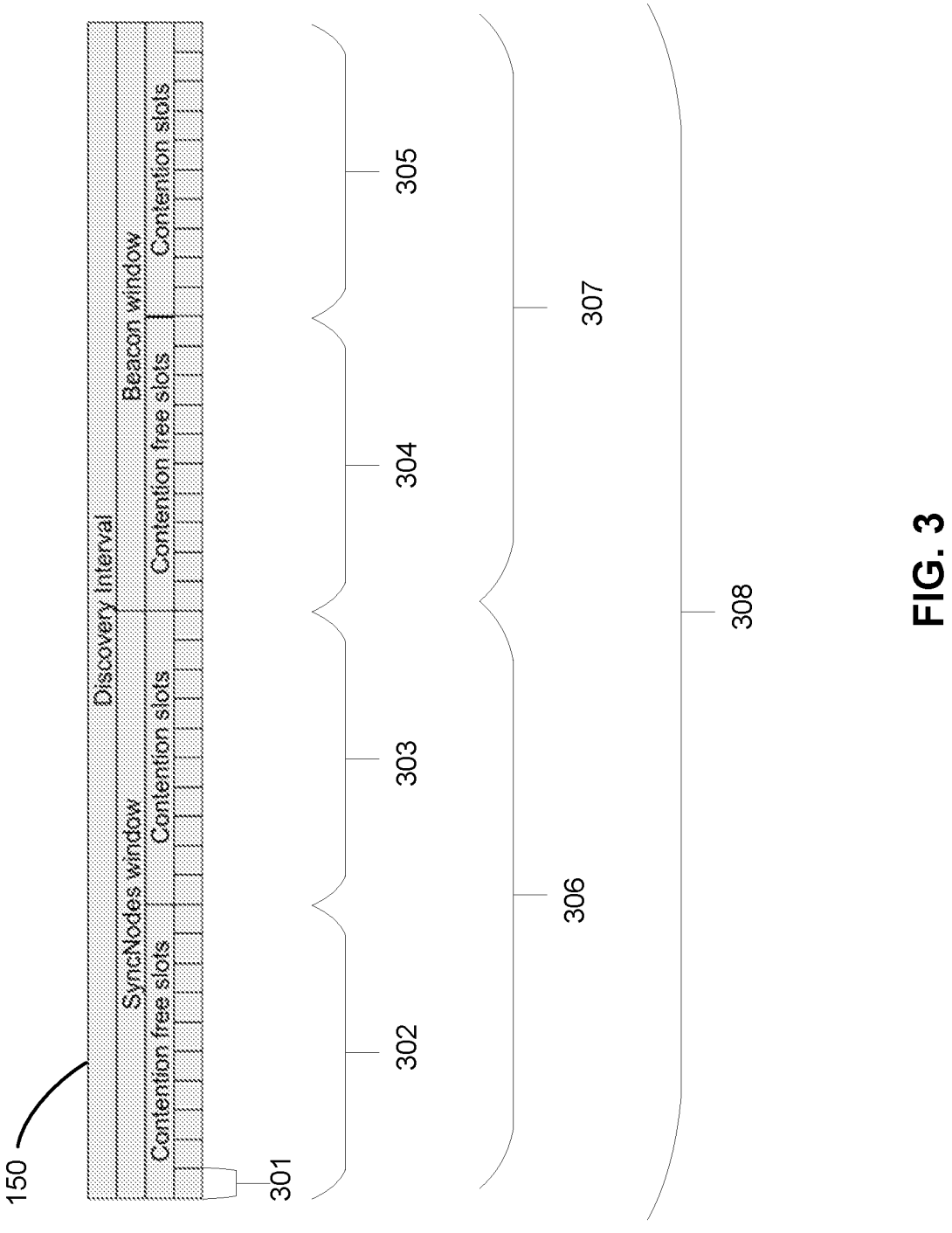
FIG. 3 is an illustration of a discovery interval data structure, according to one or more embodiments.

FIG. 3 is an illustration of a discovery interval data structure, according to one or more embodiments. The discovery interval data structure 150 divides the discovery interval 308 into time slots 301. As used herein, a "time slot" may refer to an interval of time in which a particular node 110 in a squad 105 is assigned to perform an action, such as transmitting or receiving a message. As previously mentioned, the duration of each time slot and the expiration of its corresponding timer may be a fixed constant configured for the squad and may be configured based on propagation delays for the P2P network 160. The time slots are organized into a first pool 302 of time slots and a second pool 303 of time slots. The duration of the discovery interval sets the timer for each discovery action (e.g., transmitting and receiving of messages, such as calling the synchronization service or transmitting beacons containing node information differences and other updates to a node list). The first time slots 301 are time slots reserved for nodes to transmit the unicast synchronization request during a synchronization window. The second pool 303 of time slots are time slots reserved for mobile nodes 110 to transmit the first multicast beacon during a beacon window.

The first "N" nodes in a squad 105 in sorted order each get one of the contention free slots and the rest of the devices select one of the contention slots. As used herein, "a contention free slot" may refer to a time slot that is assigned to a node according to a determined sequence. For example, each node assigned to a contention free slot may have a priority number indicating its order in the node list 151 and its priority in the discovery interval (e.g., which contention free slot it is assigned in the beacon window and synchronization window). As such, the ordering of the contention slots help to avoid collisions between transmitted messages from the nodes 110 in the squad 105. In one embodiment, the order in the node list 151 and priority in the discovery interval may be sorted according to network address. As used herein, a "contention slot" may refer to a time slot this is assigned to a node according to an undetermined sequence. For example, in one embodiment, only a fixed number of high priority nodes 110 may be assigned a contention free slot, while the remainder of nodes 110 of lower priority may be relegated to the contention slots. The contention slots may not be ordered, but may allotted randomly (e.g., random backoff), on a first come, first serve basis, or according to some other stochastic process in scenarios where all of the high priority nodes 110 in the contention free slots lose connectivity with the squad 105. As such, the contention slots ensure that a multicast beacon can be sent quickly in scenarios of major network failure or dramatic loss in connectivity amongst the squad 105.

Every node 110 may reset the discovery interval (e.g., resetting the timers configured for each node 110) upon receiving a multicast beacon (e.g., a single-multicast beacon transits the network per discovery interval). In embodiments, the node 110 that is at the top of the node list 151 (e.g., highest priority) for the squad 105 may be assigned as the beacon node 110B and may be responsible for transmitting the multicast beacon to the rest of the squad 105. A second (follow-up) multicast beacon may be transmitted to verify that the updates to the node list during the synchronization window have been accepted and the node information differences have been resolved. When transmitted during the beacon window, a multicast beacon may comprise an empty node information difference list.

If the highest priority node does not transmit the multicast beacon on schedule (e.g., discovery interval timer has expired), then the next highest priority node in the node list will be assigned as the beacon node 110B and transmit the multicast beacon to the squad 105, and so on. As such, as squads 105 merge and split, and as beacon nodes 110B lose connectivity with the squad 105, a new beacon node 110B is assigned.

Figure 4:
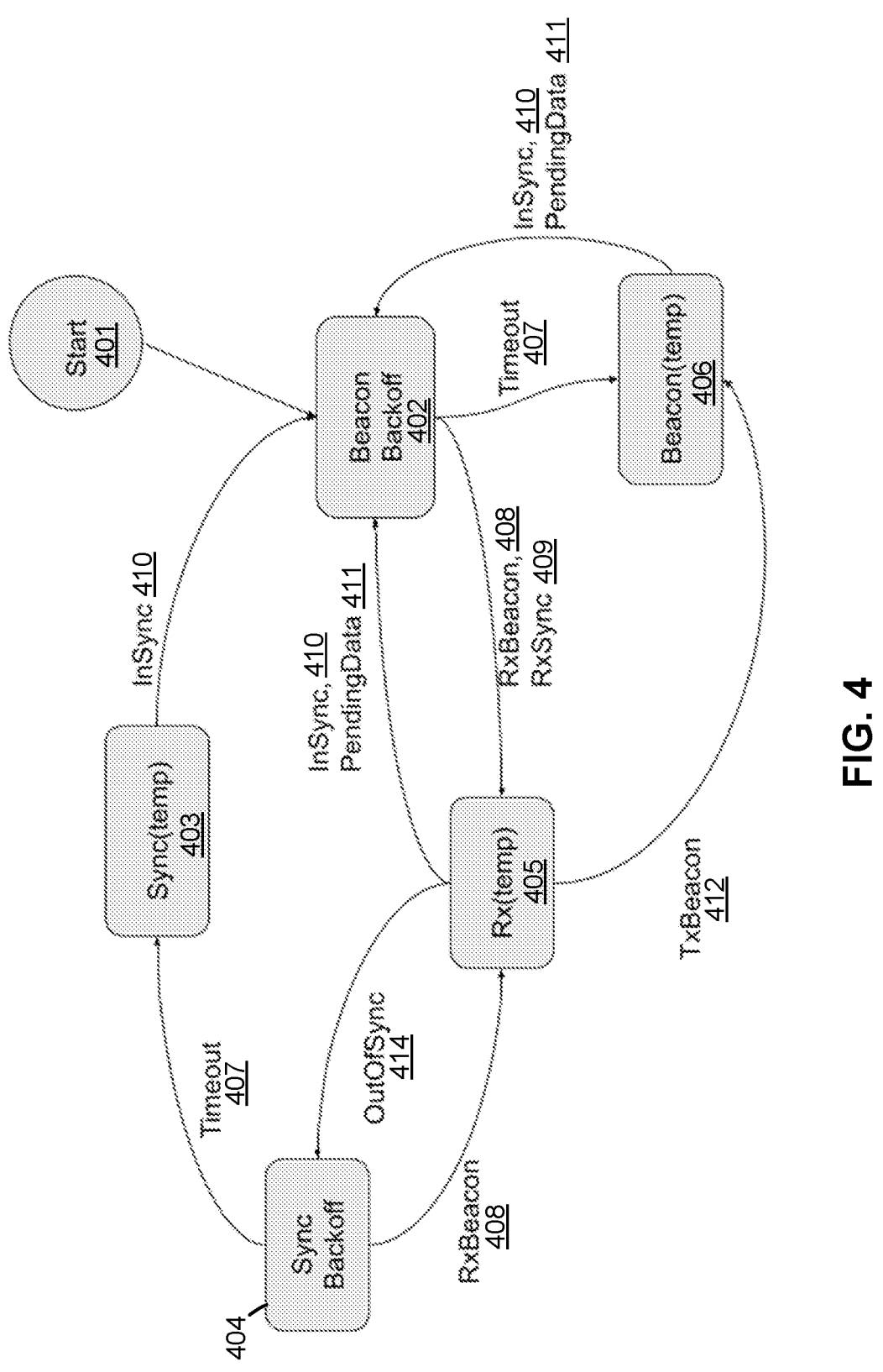
FIG. 4 is an illustration of a state diagram of a node 110 executing a discovery and synchronization protocol, according to one or more embodiments.

FIG. 4 is an illustration of a state diagram of a node 110 executing a discovery and synchronization protocol, according to one or more embodiments.

Start 401 is a state in which the synchronization protocol starts.

Beacon Backoff 402 is a state in which a node is waiting to either receive or transmit a beacon.

Sync (temp) 403 is a state in which will contact the beacon transmitter in order to synchronize data.

Sync Backoff 404 is a state in which a receiving node has determined that it is out of sync with the beacon transmitter. The receiving node is waiting for an opportunity to contact the beacon transmitter.

Rx (temp) 405 is a state in which a node will process a received beacon.

Beacon (temp) 406 is a state in which a node will transmit a beacon.

A node 110 may enter into one or more of the above-mentioned states depending on an event that causes the node 110 to transition from one state into the next. The events may include timeout 407, RxBeacon 408, RxSync 409, InSync 410, PendingData 411, TxBeacon 412, and OutofSync 414.

Timeout 407 may be an event where a specified amount of time has elapsed.

RxBeacon 408 may be an event where a beacon has been received by a node over the network.

RxSync 409 may be an event where a synchronization message has been received by a node over the network.

InSync 410 may be an event where a node has determined that its node list contains the same data as the rest of the network.

PendingData 411 may be an event where there are node list updates that need to be communicated to all nodes in the network.

TxBeacon 412 may be an event where a node needs to transmit a multicast beacon.

OutofSync 414 may be an event where a node has determined that data in its node list does not match the rest of the network.

Upon start 401, a node 110 may transition into beacon backoff 402. From beacon backoff 402, the node 110 may timeout 407 and transition into beacon (temp) 406. Or, in the event of RxBeacon 408 or RxSync 409, the node may transition into Rx (temp) 405.

From Beacon (temp) 406, the in the event of InSync 410 or PendingData 411 the node 110 transitions into Beacon Backoff 402.

From Rx (temp) 405, in the event of TxBeacon 412, the node 110 transitions into Beacon (temp) 406. In the event of InSync 410 or PendingData 411 the node 110 transitions into Beacon Backoff 402. In the event of OutOfSync 413, the node 110 transitions into Sync Backoff 404.

From Sync Backoff 404, in the event of RxBeacon 408, the node 110 transitions into Rx (temp) 405 or may timeout 407 transition into Sync (temp) 403.

From Sync (temp) 403, in the event of InSync 410, the node 110 transitions into Beacon Backoff 402.

Figure 5:
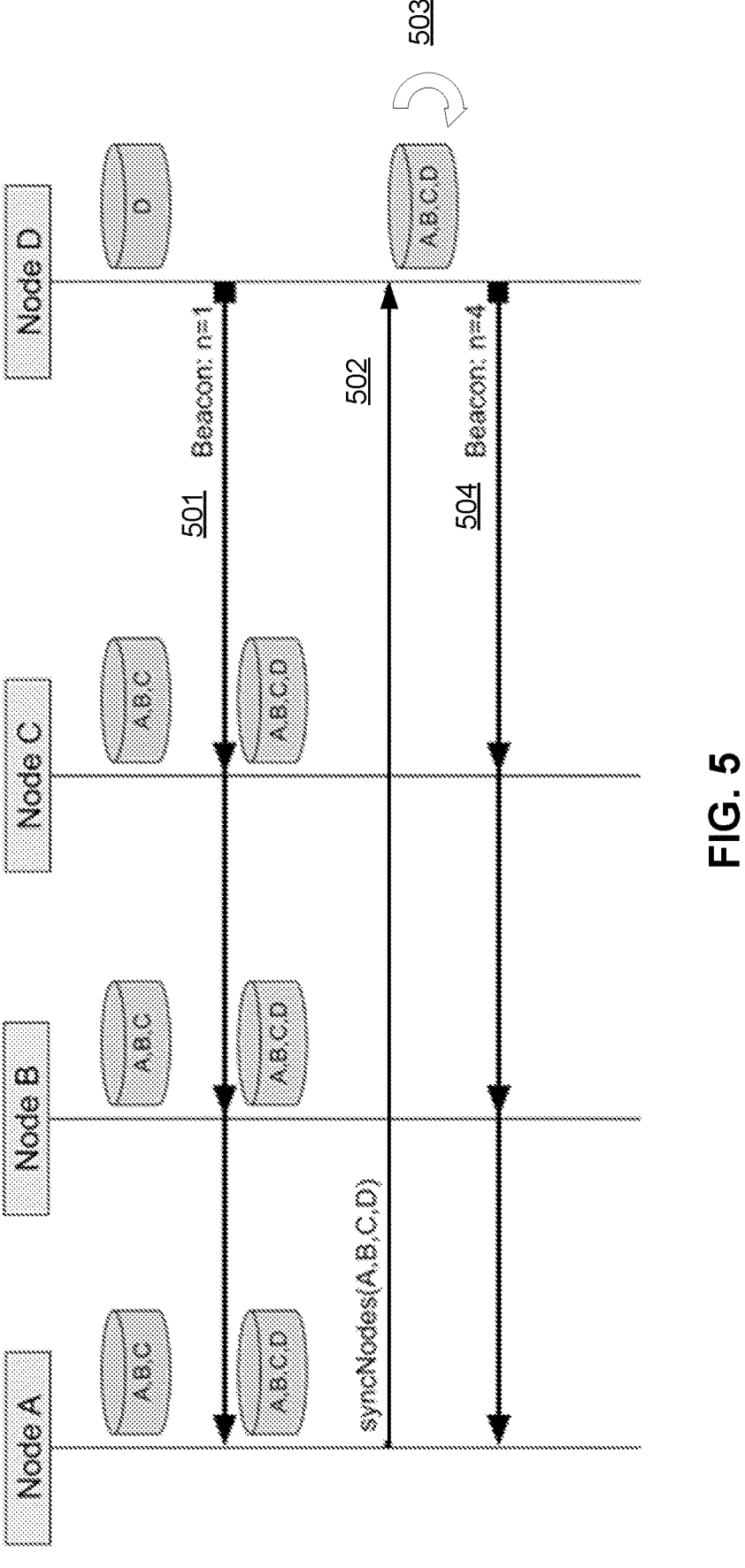
FIG. 5 illustrates a diagram of bootstrapping a node into a squad, according to one or more embodiments.

FIG. 5 illustrates a diagram of an example for bootstrapping a node into a squad, according to one or more embodiments. As shown in this example, Node D performs a method of transmitting 501 a first multicast beacon comprising a first node count, receiving 502 a unicast synchronization request comprising a second node count; generating 503 a second multicast beacon comprising the second node count, and transmitting 504 a second multicast beacon.

In this example, Nodes A, B, and C are an existing quiescent mesh with full knowledge of each other and connectiveness as a squad, e.g., squad 105. Node D boots and has no knowledge of the squad 105 beyond itself. Node D starts with a short (or zero) interval timer for transmitting the first multicast beacon, as its node list 151 is empty other than itself. As the multicast beacon propagates, Nodes A, B, and C all add node D to their respective node lists 151. The node count and hash in D's multicast beacon do not match their own, so they each start backoff timers for transmitting a unicast synchronization request at an allotted time slot during the synchronization window. Node A's backoff timer is shortest, as its address was first in the sort order of [A, B, C], which may be stored in a database in Node A. When Node A's timer expires, it transmits a unicast synchronization request to call the synchronization service of Node D. The unicast synchronization request sent from Node A to Node D comprises Node A's complete node list 151, which will include node D and its node information.

Node D compares this list of updates in the node list 151 to its own stored node list 151. Having only itself in its stored node list 151, no other Nodes 110 in the squad 105 would benefit from propagating a full set of node information differences via a second multicast beacon. Therefore, Node D follows a bootstrapping mentioned above, and transmits a second multicast beacon with the new node count (as received from node A) and a hash of the complete node list received from Node A. This second multicast beacon stops the backoff timers of Nodes B and Node C. That is, the discovery interval resets before reaching the allotted time slots for Node B and Node C in the synchronization window and they do not transmit out a unicast synchronization request to Node D during the discovery interval. At this state, all of Nodes A, B, C, and D now have up-to-date node information matching the second multicast beacon (# of nodes in the squad 105, n=4), and all of the Nodes A, B, C, and D in the squad 105 reset their beacon window timers upon reception in their respective databases.

Node A remains the first (highest priority) node in sorted order, so if no other nodes appear, Node A will be the next node in the squad 105 to transmit a multicast beacon.

Figure 6:
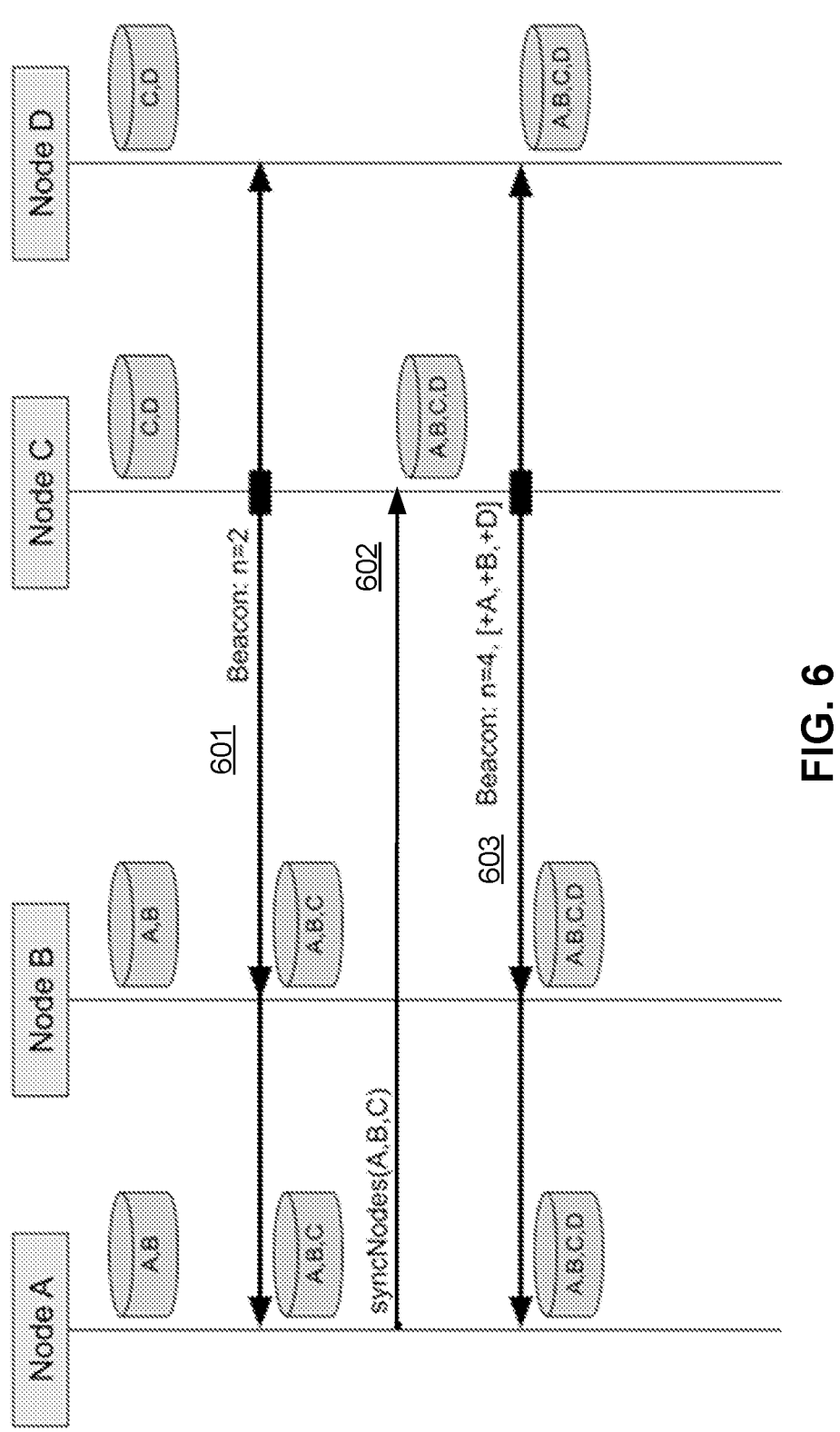
FIG. 6 illustrates a diagram of merging squads, according to one or more embodiments.

FIG. 6 illustrates a diagram of an example for merging squads, according to one or more embodiments. As shown in this example, Node C implements a method of transmitting 601 a first multicast beacon during a beacon window, receiving 602 a unicast synchronization request during a synchronization window, and transmitting 603 a second multicast beacon comprising the one or more node information differences.

In this example, Nodes A and B are an existing quiescent mesh with full knowledge (as per what is stored in their respective databases) of each other and connectivity as a squad 105A. Nodes C and D are likewise existing with knowledge of each other and connectivity as a second squad 105B. At some point prior, the underlying mesh joins these two mesh networks/squads 105 together. Convergence starts when one of the nodes' timer in the allotted time slot of the beacon window expires. In this case, Node C transmits a first multicast beacon, as it was first in the sort order of [C,D], and had no knowledge of [A,B], or their last beacon time. This first multicast beacon advertises C's known node count of 2.

Upon reception, Nodes A and B add Node C to their node lists and start backoff timers for their allotted time slots in synchronization window because the first multicast beacon's node count and hash do not match the hash of their own node information in their stored node lists. Node A's timer expires first because it is first in the sort order of [A,B], so it transmits a unicast synchronization request to call the synchronization service of Node C with its complete node list of known nodes (including C itself, but not D). Node C compares this node list to its own stored node list. As Node C was missing nodes A and B from its stored node list, it adds those nodes to a node information difference list to be propagated in a second multicast beacon. As Node D was missing from Node A's node list, Node D is also added to the node information difference list. Node C then immediately transmits the second multicast beacon with the three node information differences in the node information difference list. This second multicast beacon has an updated node count of 4 nodes and a corresponding updated hash.

Upon reception of the beacon, Nodes A, B, and D incorporate the node information difference into their own node lists. As this node information difference list brings their node lists into alignment with Node C's, they compute the same node count and hash as in the second multicast beacon. This cancels any remaining timers for the remaining time slots in the synchronization windows and resets the timers for the beacon window. In the resulting squad, Node A appears first in sorted order, so it will be the first to transmit a first (new) multicast beacon if no other nodes join the squad 105.

Figure 7:
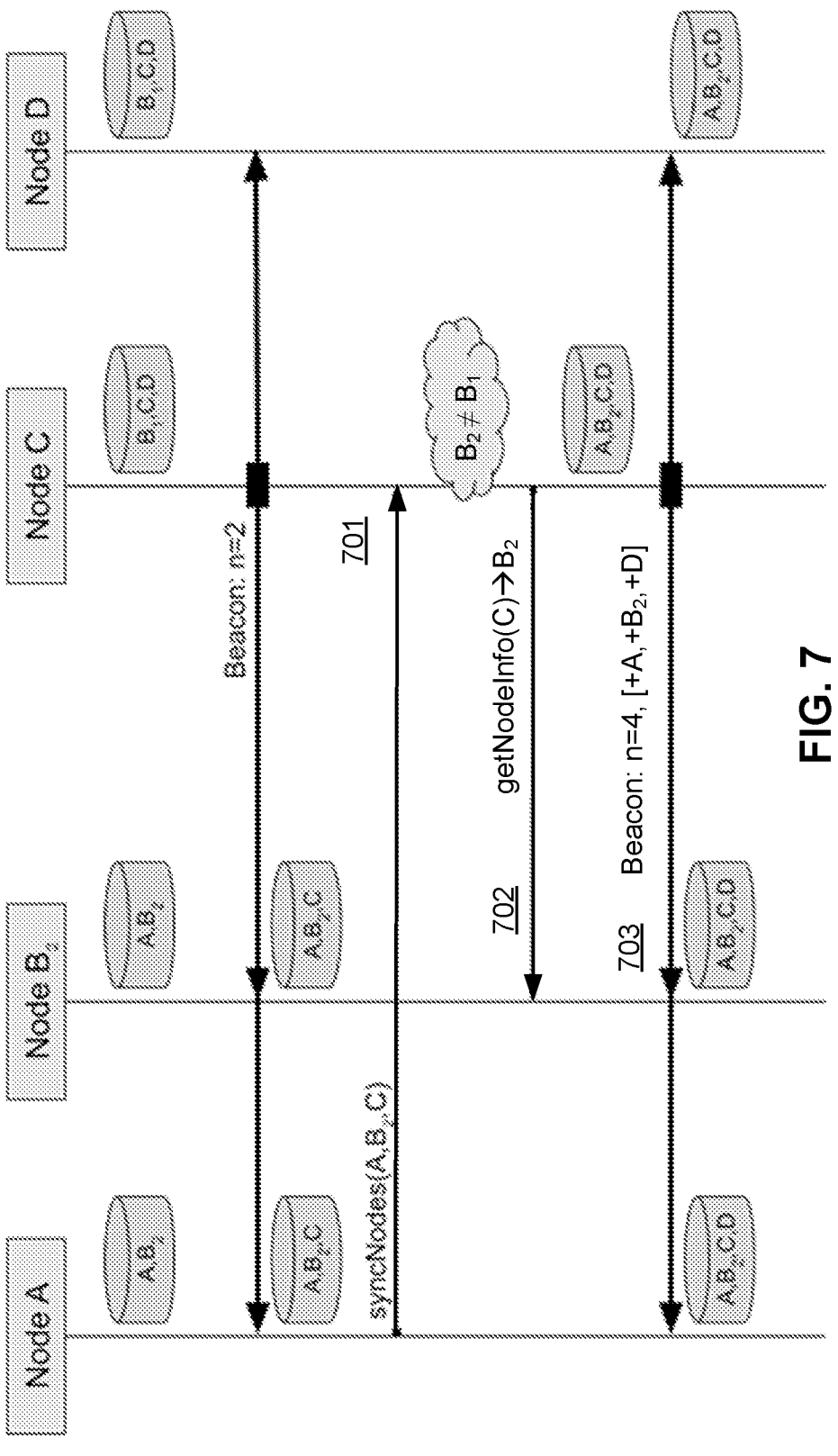
FIG. 7 illustrates a diagram of changing an existing node's node information, according to one or more embodiments.

FIG. 7 illustrates a diagram of an example for changing an existing node's node information, according to one or more embodiments. As shown, Node C performs a method of receiving 701 a unicast synchronization request from a first node, Node A, in the plurality of Nodes A, B, C, and D in the squad 105, the first node, Node A being different from one or more nodes, Node B, associated with one or more node information differences. The method further comprises receiving 702 a response to the request for the node information from the one or more nodes, Node B, associated with the one or more node information differences, the response comprising the one or more node information differences.

The method further comprises transmitting 703 a second multicast beacon comprising the one or more node information differences.

When a node, Node B, changes its identifier (e.g., name), services, or other node information, it rejoins the squad 105 according to the bootstrap method of FIG. 5. Since the second multicast beacon from the previous discovery interval includes Node B's most recent node information, the other nodes 110 in the squad 105 may immediately update their node lists and follow said bootstrap method. However, if node B rejoins a fragment of the network, or some other network or squad, then those networks merge with a network where node B was previously known, but with old node information.

In this example, Nodes C and D may be aware of a prior instance of Node B's old node information (denoted B1). However, Node B had changed its service set (updating its node information to B2) and restarted in a network/squad with Node A. These two meshes then join, as in the merger method of FIG. 6, except they have conflicting information for Node B. In this case, when Node A transmits a unicast synchronization request to call the synchronization service of Node C, Node C has no way of knowing whether its stored node list or the node list of node A is correct with respect to Node B's services. Instead of guessing, Node C transmits a node information call to Node B. In this way, Node B may be a single point of truth for node information about Node B, and only the beacon transmitter (beacon node 110B) needs to call Node B to arbitrate any node information differences. Having determined that the correct information for Node B is, in fact, B2, C then transmits a second (follow-up) multicast beacon with the resulting node information differences, including B2. This resolves the difference across all nodes that hear the second multicast beacon.

Figure 8:
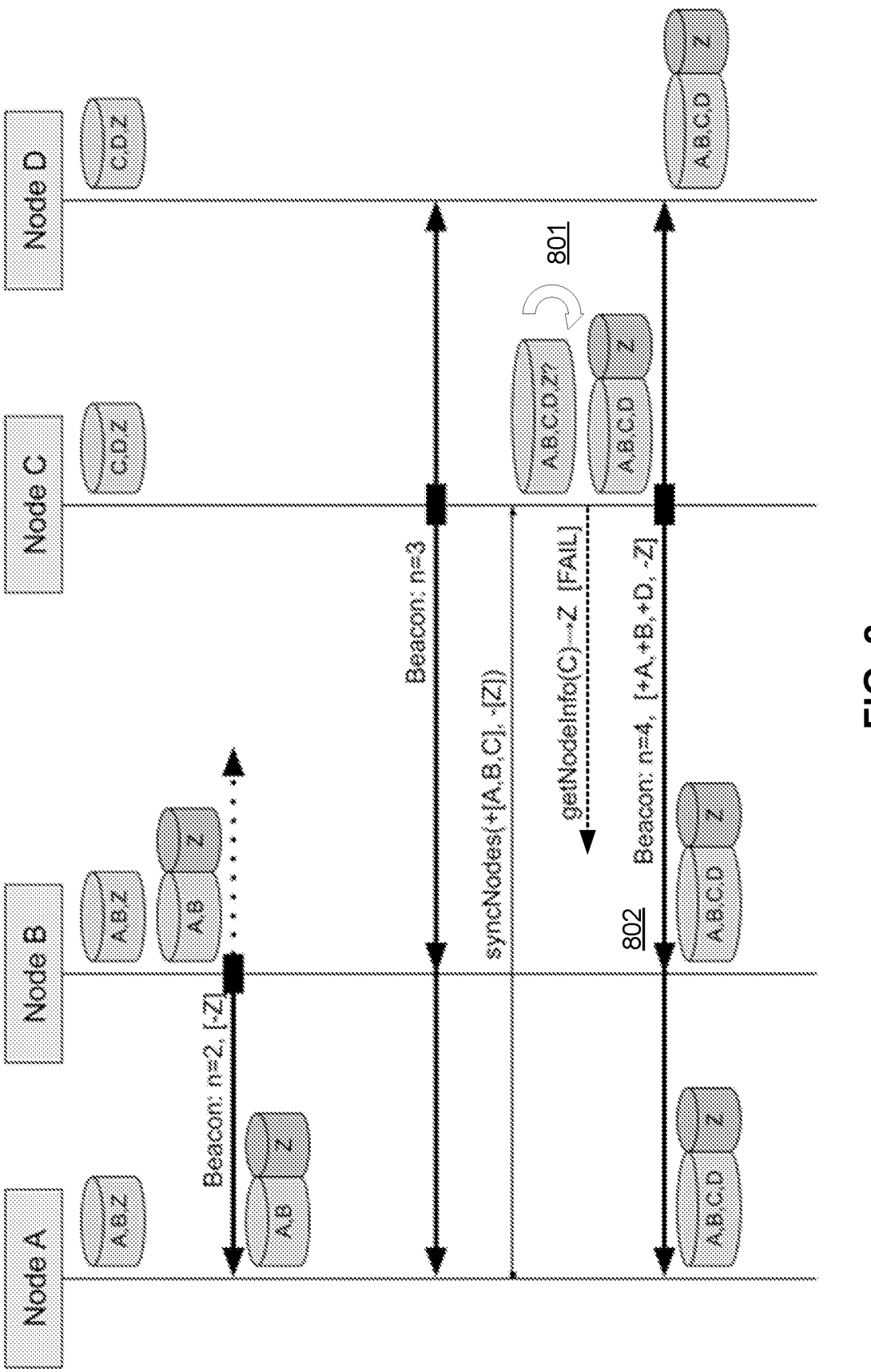
FIG. 8 illustrates a diagram of removing a node from a current node list, according to one or more embodiments.

FIG. 8 illustrates a diagram of an example for removing a node from a current node list, according to one or more embodiments. In the embodiment, the node information differences comprise a node removal. As shown, Node C performs a method of determining 801 a failure in the request for the node information differences at a node, Node Z, relating to the node removal, and transmitting 802 a second multicast beacon comprising the node removal.

When a node, Node A, elects to remove Node Z from its current node list, it moves Node Z to its removed list. Other nodes in the connected mesh are then notified in a multicast beacon and likewise move the node from their current node lists to their removed lists. If other nodes are aware of Node Z, but do not hear the multicast beacon, either because they simply missed the multicast beacon, or because they were part of another mesh cluster/squad 105 that later merged, a conflict may exist. This conflict will trigger the beacon node 110B (here Node C) to transmit a node information call to Node Z. If the node information call is successful, Node C will include Node Z in a second multicast beacon as an updated addition to the squad 105. If the node information call fails, Node C will include Node Z a removal in the second multicast beacon as a removal from the squad 105. As shown in FIG. 8, Node Z is first removed by a multicast beacon from Node B, but only Node A hears the multicast beacon. Later, Node C merges the squads 105 and configures new timers for the beacon window of the discovery interval, and Node A responds to the difference in hash with a unicast synchronization request. This triggers Node C to resolve the conflict about Node Z by trying and failing to make a node information call to Node Z. Then, Node C issues a second (follow-up) multicast beacon that adds any missing nodes and removes Node Z.

FIG. 9A illustrates a method of synchronization of nodes performed using instructions of synchronization request module 251, according to one or more embodiments. The method may be implemented as instructions stored on a computer-readable medium of a mobile node 110, namely, a synch node 110A. When one or more processors of the mobile node 110 executes the instructions, the instructions cause the processor to perform the method.

The processor listens 901 for a first multicast beacon during a duration of a discovery interval. For example, synch node 110A may be allotted a time slot in the synchronization window and will wait to hear the first multicast beacon during its allotted time slot. As one example, the synch node 110A may be the third time slot in the synchronization window and will have until the expiration of the third timer in the synchronization window to expect the first multicast beacon from a beacon node 110B. If it does not hear the first multicast beacon by the expiration of the timer for the third time slot, the discovery interval will move onto the next node, which will listen for the first multicast beacon. If the synch node 110A does hear the first multicast beacon during its time slot in the discovery interval, it will transmit a unicast synchronization request.

In response to receiving the first multicast beacon during the duration of the discovery interval, the processor transmits 902 a unicast synchronization request to the transmitter of the first multicast beacon.

FIG. 9B illustrates a method of synchronization of nodes performed using instructions of multicast beaconing module 252, according to one or more embodiments. The method may be implemented as instructions stored on a computer-readable medium of a mobile node 110, namely, a beacon node 110B. When one or more processors of the mobile node 110 executes the instructions, the instructions cause the processor to perform the method.

The processor compares 903 the node list in a unicast synchronization request to a stored node list of a transmitter of the first multicast beacon. For example, a beacon node 110B responsible for transmitting the first multicast beacon receives a node list from a synch node 110A that is next in line in the synchronization window as a response to the first multicast beacon.

The processor determines 904 one or more node information differences based on the comparison. For example, the synch node 110A that transmits the unicast synchronization request may have a node list and hash that differs from the beacon node 110B.

In response to determining the one or more node information differences, the processor requests 905 node information from one or more nodes associated with the one or more node information differences. For example, the node list of the synch node 110A may include a removal of a node from the squad 105, and the beacon node 110B may transmit a node information call to the node associated with the removal, i.e., the node that may or may not have been removed from the squad 105.

Figure 10:
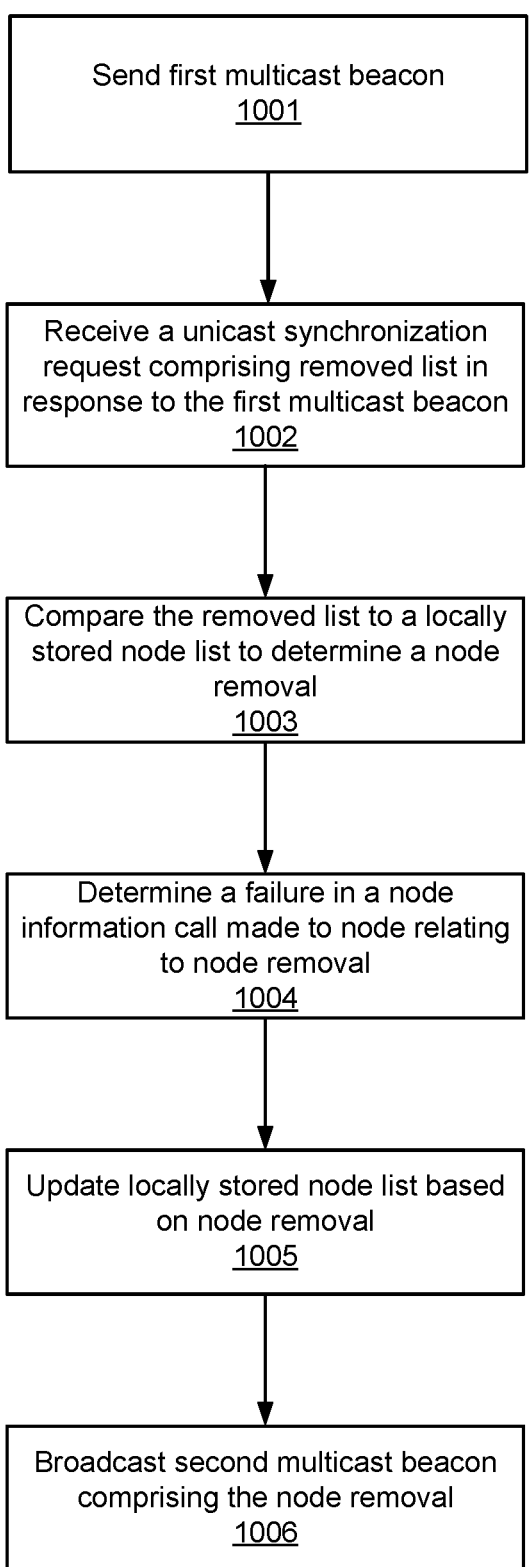
FIG. 10 illustrates a method of pruning a node list for a squad, according to one or more embodiments.

FIG. 10 illustrates a method of pruning a node list for a squad, according to one or more embodiments. In embodiments, the node list may be implemented as a distributed database. The method may be implemented as instructions stored on a computer-readable medium of a mobile node 110. When one or more processors of the mobile node 110 executes the instructions, the instructions cause the processor to perform the method. In embodiments, the method may be implemented as computer-readable instructions of pruning module 257. As previously mentioned, each node also maintains a list of recently removed nodes, i.e., a removed list. In embodiments, the removed list may not be included in node counts or hash computations, but rather, may serve as a "penalty box" for recently removed nodes.

The processor 1001 transmits a first multicast beacon.

The processor receives 1002 a unicast synchronization request in response to the first multicast beacon. The unicast synchronization request comprising a removed list for the distributed database.

The processor compares 1003 the removed list to a locally stored node list to determine a node removal.

The processor determines 1004 a failure in a node information call made to a node relating to the node removal.

Subsequent to (e.g., responsive to) determining the failure, the processor updates 1005 the locally stored node list based on the node removal.

The processor transmits 1006 a second multicast beacon comprising the node removal. Nodes receiving the second multicast beacon update a locally stored removed list using the node removal.

Embodiments provide several technical advantages. In embodiments, a beacon transmitter acts as a self-nominated time base and arbiter for the known mesh, and changes are pushed back to the beacon transmitter for difference resolution and re-beaconing. In a mesh, multicasts expand outward from the transmitter, so distant nodes will receive the multicast at later times than nearer nodes. Unicasting to the original transmitter allows that transmitter to mediate the timing and prevent multiple responses from near and far nodes (e.g., avoids collision). Furthermore, embodiments reduce the number of multicast beacons that need to be sent in order to synchronize the distributed databases of the mesh (e.g., the node lists for the squad).

Computing Machine Architecture

Figure 11:
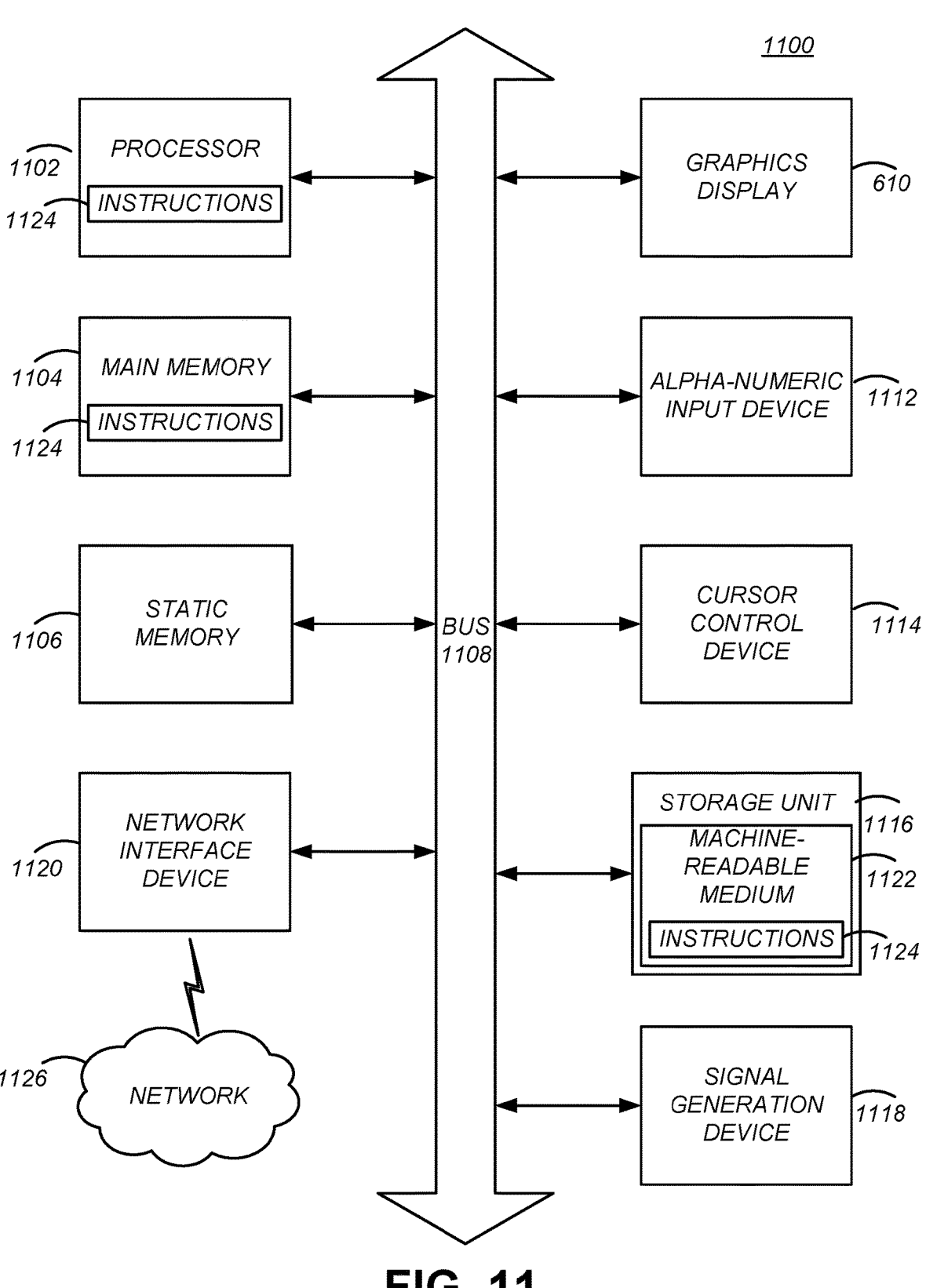
FIG. 11 is a block diagram illustrating components of an example machine able to read instructions from a machine-readable medium and execute them in a processor (or controller), according to one or more embodiments.

FIG. 11 is a block diagram illustrating components of an example machine able to read instructions from a machine-readable medium and execute them in a processor (or controller), according to one or more embodiments. Specifically, FIG. 11 shows a diagrammatic representation of a machine in the example form of a computer system 1100 within which instructions 1124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment. In the context of a particular machine some or all the components illustrated and described with FIG. 11 may be applicable. For example, HQ 149 and any of the mobile nodes 110 may use some or all of the components illustrated and described with FIG. 11, while a mobile node 110 may use a substantially few components.

The machine may be a server computer, a client computer, a personal computer (PC), a tablet PC, a personal digital assistant (PDA), a cellular telephone, a smartphone, a web appliance, a network router, switch or bridge, a mobile node or any machine capable of executing instructions 1124 (sequential or otherwise) that specify actions to be taken by that machine. Further, while only a single machine is illustrated, the term "machine" shall also be taken to include any collection of machines that individually or jointly execute instructions 1124 to perform any one or more of the methodologies discussed herein.

The example computer system 1100 includes a processor 1102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1104, and a static memory 1106, which are configured to communicate with each other via a bus 1108. The computer system 1100 may further include graphics display unit 610 (e.g., a plasma display panel (PDP), a liquid crystal display (LCD), a light emitting diode (LED) display, an organic light emitting diode (OLED) display, a projector, or a cathode ray tube (CRT)). The computer system 1100 may also include alphanumeric input device 1112 (e.g., a keyboard), a cursor control device 1114 (e.g., a mouse, a trackball, a joystick, a motion sensor, or other pointing instrument), a storage unit 1116, a signal generation device 1118 (e.g., a speaker), and a network interface device 1120, which also are configured to communicate via the bus 1108.

The storage unit 1116 includes a machine-readable medium 1122 on which is stored instructions 1124 (e.g., software) embodying any one or more of the methodologies or functions described herein. The instructions 1124 (e.g., software) may also reside, completely or at least partially, within the main memory 1104 or within the processor 1102 (e.g., within a processor's cache memory) during execution thereof by the computer system 1100, the main memory 1104 and the processor 1102 also constituting machine-readable media. The instructions 1124 (e.g., software) may be transmitted or received over a network 1126 via the network interface device 1120.

While machine-readable medium 1122 is shown in an example embodiment to be a single medium, the term "machine-readable medium" should be taken to include a single medium or multiple media (e.g., a centralized or distributed database, or associated caches and servers) able to store instructions (e.g., instructions 1124). The term "machine-readable medium" shall also be taken to include any medium that is capable of storing instructions (e.g., instructions 1124) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The disclosed system provides for close to or real-time updated data of an environmental surroundings in which processing resources are limited and network communication resources are limited. The data corresponding to environmental surroundings may include information physical environment as well as contextual information about the surroundings in that physical environment. By receiving this information in close to or at real time, a user present in those surrounding now is provided information otherwise unavailable to them to help them enhance their perception capabilities within that environment. The disclosed configurations enable groups of computing devices having limited capabilities (e.g., computing resource constraints (e.g., processor, memory), network communications constraints, and/or power source constraints (e.g., battery life and/or capacity)) to pool their capabilities together to enable the execution of resource intensive tasks. The execution of resource intensive tasks may provide for each time updates with computing devices such as information on heads up displays or augmented reality overlays of real time captured video. The disclosed configurations also provide for a scheme to enable multiple mobile computing systems to communicate with each other using an unreliable network with network properties that dynamically change as each of the nodes move with respect to each other. For example, as nodes leave and enter networks, information may be dynamically updated amongst prior and new updated networks to provide new contextual information for all nodes within those respective networks.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer-readable storage medium storing instructions that, when executed by a computer system, causes the computer system to:
   receive, by a first node of a plurality of nodes in a network and storing a first grouping of nodes specifying nodes of the plurality of nodes, a first multicast beacon from a second node separate from nodes in the plurality of nodes, the first multicast beacon being a broadcast signal and including a first count of nodes;
   update, by the first node, the first grouping of nodes to include the second node in response to receipt of the first multicast beacon;
   start, by the first node, a backoff timer for transmission of a unicast synchronization request to the second node, the unicast synchronization request configured to initiate a synchronization service of the second node;
   transmit, by the first node, the unicast synchronization request to the second node in response to the backoff timer expiring, the unicast synchronization request including the updated first grouping of nodes; and
   receive, by the first node, a second multicast beacon from the second node, the second multicast beacon being a broadcast signal and including a second count of nodes.

2. The non-transitory computer-readable storage medium of claim 1:
   wherein the second multicast beacon further includes a first hash of node information in a second grouping of nodes (a) specifying nodes in the plurality of nodes and (b) stored by the second node; and
   wherein the instructions, when executed by the computer system, further cause the computer system to:
      confirm, by the first node, a third count of nodes based on the updated first grouping of nodes matches the second count of nodes;
      generate, by the first node, a second hash of node information in the updated first grouping of nodes; and
      confirm, by the first node, the first hash matches the second hash.

3. The non-transitory computer-readable storage medium of claim 1:
   wherein the second multicast beacon includes a node information difference set representative of one or more differences between the updated first grouping of nodes a second grouping of nodes (a) specifying nodes in the plurality of nodes and (b) stored by the second node;
   wherein the second multicast beacon further includes a first hash of node information in the second grouping of nodes; and
   wherein the instructions, when executed by the computer system, further cause the computer system to:
      revise, by the first node, the updated first grouping of nodes according to the node information difference set;
      generate, by the first node, a third count of nodes based on the revised first grouping of nodes;
      generate, by the first node, a second hash of node information in the revised first grouping of nodes;
      confirm, by the first node, the second count of nodes matches the third count of nodes; and
      confirm, by the first node, the first hash matches the second hash.

4. The non-transitory computer-readable storage medium of claim 1, wherein the instructions, when executed by the computer system, further cause the computer system to:
   subsequent to receipt of the second multicast beacon from the second node, transmit, by the first node, a third multicast beacon, wherein the third multicast beacon is a broadcast signal and includes the second count of nodes.

5. The non-transitory computer-readable storage medium of claim 1, wherein the instructions, when executed by the computer system, further cause the computer system to:
   receive, by a third node in the plurality of nodes, the first multicast beacon from the second node; and
   responsive to receipt of the first multicast beacon, start, by the third node, a second backoff timer for transmission of the unicast synchronization request, the second backoff timer being longer than the backoff timer of the first node.

6. The non-transitory computer-readable storage medium of claim 5, wherein the instructions, when executed by the computer system, further cause the computer system to:
   receive, by the third node, the second multicast beacon from the second node; and
   cancel, by the third node, the second backoff timer in response to receipt of the first multicast beacon.

7. The non-transitory computer-readable storage medium of claim 1, wherein at least one of:
   the first node transmits the unicast synchronization request to the second node responsive to the backoff timer expiring and further responsive to the first node not receiving another multicast beacon from the second node; or
   the first node starts the backoff timer responsive to the first node determining the second node is not in the plurality of nodes.

8. A method comprising:
   receiving, by a first node of a plurality of nodes in a network and storing a first grouping of nodes specifying nodes of the plurality of nodes, a first multicast beacon from a second node separate from nodes in the plurality of nodes, the first multicast beacon being a broadcast signal and including a first count of nodes;

updating, by the first node, the first grouping of nodes to include the second node in response to receiving the first multicast beacon;

starting, by the first node, a backoff timer for transmission of a unicast synchronization request to the second node, the unicast synchronization request configured to initiate a synchronization service of the second node;

transmitting, by the first node, the unicast synchronization request to the second node in response to the backoff timer expiring, the unicast synchronization request including the updated first grouping of nodes; and receiving, by the first node, a second multicast beacon from the second node, the second multicast beacon being a broadcast signal and including a second count of nodes.

9. The method of claim 8:

wherein the second multicast beacon further includes a first hash of node information in a second grouping of nodes (a) specifying nodes in the plurality of nodes and (b) stored by the second node; and further comprising:

confirming, by the first node, a third count of nodes based on the updated first grouping of nodes matches the second count of nodes;

generating, by the first node, a second hash of node information in the updated first grouping of nodes; and confirming, by the first node, the first hash matches the second hash.

10. The method of claim 8:

wherein the second multicast beacon includes a node information difference set representative of one or more differences between the updated first grouping of nodes a second grouping of nodes (a) specifying nodes in the plurality of nodes and (b) stored by the second node; and wherein the second multicast beacon further includes a first hash of node information in the second grouping of nodes; and further comprising:

revising, by the first node, the updated first grouping of nodes according to the node information difference set;

generating, by the first node, a third count of nodes based on the revised first grouping of nodes;

generating, by the first node, a second hash of node information in the revised first grouping of nodes;

confirming, by the first node, the second count of nodes matches the third count of nodes; and confirming, by the first node, the first hash matches the second hash.

11. The method of claim 8, further comprising:

subsequent to receiving the second multicast beacon from the second node, transmitting, by the first node, a third multicast beacon, wherein the third multicast beacon is a broadcast signal and includes the second count of nodes.

12. The method of claim 8, further comprising:

receiving, by a third node in the plurality of nodes, the first multicast beacon from the second node; and responsive to receiving the first multicast beacon, starting, by the third node, a second backoff timer for transmission of the unicast synchronization request, the second backoff timer being longer than the backoff timer of the first node.

13. The method of claim 12, further comprising:

receiving, by the third node, the second multicast beacon from the second node; and canceling, by the third node, the second backoff timer in response to receiving the first multicast beacon.

14. The method of claim 8, wherein at least one of:

the first node transmits the unicast synchronization request to the second node responsive to the backoff timer expiring and further responsive to the first node not receiving another multicast beacon from the second node; or the first node starts the backoff timer responsive to the first node determining the second node is not in the plurality of nodes.

15. A system comprising:

a set of one or more processors; and a computer-readable storage medium storing instructions that, when executed by the set of one or more processors, causes the set of one or more processors to:

receive, by a first node of a plurality of nodes in a network and storing a first grouping of nodes specifying nodes of the plurality of nodes, a first multicast beacon from a second node separate from nodes in the plurality of nodes, the first multicast beacon being a broadcast signal and including a first count of nodes;

update, by the first node, the first grouping of nodes to include the second node in response to receiving the first multicast beacon;

start, by the first node, a backoff timer for transmission of a unicast synchronization request to the second node, the unicast synchronization request configured to initiate a synchronization service of the second node;

transmit, by the first node, the unicast synchronization request to the second node in response to the backoff timer expiring, the unicast synchronization request including the updated first grouping of nodes; and receive, by the first node, a second multicast beacon from the second node, the second multicast beacon being a broadcast signal and including a second count of nodes.

16. The system of claim 15:

wherein the second multicast beacon further includes a first hash of node information in a second grouping of nodes (a) specifying nodes in the plurality of nodes and (b) stored by the second node; and wherein the instructions, when executed by the set of one or more processors, further cause the set of one or more processors to:

confirm, by the first node, a third count of nodes based on the updated first grouping of nodes matches the second count of nodes;

generate, by the first node, a second hash of node information in the updated first grouping of nodes; and confirm, by the first node, the first hash matches the second hash.

17. The system of claim 15:

wherein the second multicast beacon includes a node information difference set representative of one or more differences between the updated first grouping of nodes a second grouping of nodes (a) specifying nodes in the plurality of nodes and (b) stored by the second node;

wherein the second multicast beacon further includes a first hash of node information in the second grouping of nodes; and wherein the instructions, when executed by the set of one or more processors, further cause the set of one or more processors to:

revise, by the first node, the updated first grouping of nodes according to the node information difference set;

generate, by the first node, a third count of nodes based on the revised first grouping of nodes;

generate, by the first node, a second hash of node information in the revised first grouping of nodes;

confirm, by the first node, the second count of nodes matches the third count of nodes; and confirm, by the first node, the first hash matches the second hash.

18. The system of claim 15, wherein the instructions, when executed by the set of one or more processors, further cause the set of one or more processors to:

subsequent to receipt of the second multicast beacon from the second node, transmit, by the first node, a third multicast beacon, wherein the third multicast beacon is a broadcast signal and includes the second count of nodes.

19. The system of claim 15, wherein the instructions, when executed by the set of one or more processors, further cause the set of one or more processors to:

receive, by a third node in the plurality of nodes, the first multicast beacon from the second node; and responsive to receipt of the first multicast beacon, start, by the third node, a second backoff timer for transmission of the unicast synchronization request, the second backoff timer being longer than the backoff timer of the first node.

20. The system of claim 19, wherein the instructions, when executed by the set of one or more processors, further cause the set of one or more processors to:

receive, by the third node, the second multicast beacon from the second node; and cancel, by the third node, the second backoff timer in response to receipt of the first multicast beacon.

* * * * *